US011996965B2

(12) United States Patent
Ma et al.

(10) Patent No.: US 11,996,965 B2
(45) Date of Patent: May 28, 2024

(54) SIGNAL TRANSMISSION METHOD AND COMMUNICATION APPARATUS

(71) Applicant: HUAWEI TECHNOLOGIES CO., LTD., Guangdong (CN)

(72) Inventors: Qianli Ma, Chengdu (CN); Fengwei Liu, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/687,082

(22) Filed: Mar. 4, 2022

(65) Prior Publication Data
US 2022/0271983 A1 Aug. 25, 2022

Related U.S. Application Data

(63) Continuation of application No. PCT/CN2020/112859, filed on Sep. 1, 2020.

(30) Foreign Application Priority Data

Sep. 5, 2019 (CN) .......................... 201910838732.0

(51) Int. Cl.
H04L 5/00 (2006.01)
H04L 25/03 (2006.01)
H04L 27/26 (2006.01)

(52) U.S. Cl.
CPC ...... *H04L 27/26025* (2021.01); *H04L 5/0094* (2013.01); *H04L 25/03828* (2013.01); *H04L 27/2636* (2013.01); *H04L 27/2644* (2013.01)

(58) Field of Classification Search
CPC ............. H04L 27/26025; H04L 5/0094; H04L 25/03828; H04L 27/2636; H04L 27/2644
See application file for complete search history.

(56) References Cited

U.S. PATENT DOCUMENTS 11,039,302 B2 * 6/2021 Chang ................... H04W 76/27
2010/0008331 A1 * 1/2010 Li ......................... H04L 5/0053
370/335

(Continued)

FOREIGN PATENT DOCUMENTS

CN 102036401 A 4/2011
CN 102415035 A 4/2012
(Continued)

OTHER PUBLICATIONS

Mansoor Shafi et al:"5G: A Tutorial Overview of Standards, Trials, Challenges, Deployment, and Practice",Jun. 2017, total 21 pages.
(Continued)

*Primary Examiner* — Sophia Vlahos
(74) *Attorney, Agent, or Firm* — WOMBLE BOND DICKINSON (US) LLP

(57) ABSTRACT

Embodiments of this application provide a signal transmission method and a communication apparatus in a multi-waveform scenario, and are applied to a scenario in which a single-carrier waveform and a multi-carrier waveform coexist. In this method, a network device indicates, via first indication information, a terminal device to transmit a signal by using transmission parameters corresponding to the first indication information, so that the terminal device transmits the signal by using the specified transmission parameters. Transmission parameters includes at least two of a transmission bandwidth, an extended bandwidth, or a total bandwidth. According to the embodiments of this application, a transmit end may perform sending by using the single-carrier waveform, and a receive end may perform receiving by using the multi-carrier waveform; or a transmit end may perform sending by using the multi-carrier waveform, and a receive end may perform receiving by using the single-carrier waveform.

13 Claims, 13 Drawing Sheets

(56) References Cited

U.S. PATENT DOCUMENTS

| | | | |
|---|---|---|---|
| 2011/0293035 A1 | 12/2011 | Kobayashi | |
| 2016/0192331 A1* | 6/2016 | Liang | H04L 5/1469 370/329 |
| 2017/0367099 A1 | 12/2017 | Cariou et al. | |
| 2018/0048435 A1* | 2/2018 | Islam | H04W 72/0453 |
| 2018/0049067 A1* | 2/2018 | He | H04L 5/0037 |
| 2019/0246420 A1 | 8/2019 | Park et al. | |
| 2019/0261234 A1 | 8/2019 | Park et al. | |
| 2019/0261315 A1 | 8/2019 | Zhang et al. | |
| 2019/0261373 A1 | 8/2019 | Kimura et al. | |
| 2019/0268185 A1 | 8/2019 | Wang et al. | |
| 2019/0334753 A1* | 10/2019 | Tang | H04L 5/0094 |
| 2020/0127778 A1 | 4/2020 | Zhuang et al. | |
| 2020/0280962 A1* | 9/2020 | Li | H04W 72/20 |

FOREIGN PATENT DOCUMENTS

| | | |
|---|---|---|
| CN | 102474405 A | 5/2012 |
| CN | 102668673 A | 9/2012 |
| CN | 105812106 A | 7/2016 |
| CN | 107295652 A | 10/2017 |
| CN | 108738113 A | 11/2018 |
| CN | 108964851 A | 12/2018 |
| CN | 109392152 A | 2/2019 |
| CN | 109475003 A | 3/2019 |
| CN | 110138534 A | 8/2019 |
| EP | 3522647 A1 | 8/2019 |
| WO | 2016118765 A1 | 7/2016 |

OTHER PUBLICATIONS

JInling Huang et al:"Analysis of the New Multi-Carrier Technology for 5G," Aug. 2017,total 3 pages.

3GPP TSG-RAN WG2 Meeting #102, R2-1807110,UE capability for Maximum channel bandwidth,Qualcomm Incorporated,Busan, South Korea, May 21-25, 2018,total 6 pages.

Vivo, Discussion on NR resource allocation. 3GPP TSG RAN WG1 Meeting #88bis, Spokane, USA, Apr. 3-7, 2017, R1-1704501, 3 pages.

Alcatel-Lucent, Alcatel-Lucent Shanghai Bell, Considerations of Multi-Band NB-Iot. 3GPP TSG RAN WG1 NB-IoT ad-hoc, Budapest, Hungary, 18th Jan. 20, 2016, R1-160180, 3 pages.

* cited by examiner

SIGNAL TRANSMISSION METHOD AND COMMUNICATION APPARATUS

CROSS-REFERENCE TO RELATED APPLICATIONS

This application is a continuation of International Application No. PCT/CN2020/112859, filed on Sep. 1, 2020, which claims priority to Chinese Patent Application No. 201910838732.0, filed on Sep. 5, 2019. The disclosures of the aforementioned applications are hereby incorporated by reference in their entireties.

TECHNICAL FIELD

Embodiments of this application relate to the field of communication technologies, and specifically, to a signal transmission method and a communication apparatus.

BACKGROUND

Waveforms in a communication system are classified into single-carrier waveforms and multi-carrier waveforms. A typical multi-carrier waveform is an orthogonal frequency division multiplexing (OFDM) waveform. The OFDM waveform can be used to convert a high-speed data stream into a plurality of parallel low-speed data streams through serial-to-parallel conversion, and then the data streams are allocated to several sub-channels on subcarriers with different frequencies for transmission, to improve spectrum utilization. However, the OFDM waveform has a relatively high peak to average power ratio (PAPR), and may further damage orthogonality between the sub-channels. Consequently, interference is caused, and system performance deteriorates. Therefore, a discrete Fourier transform spread orthogonal frequency division multiplexing (DFT-s-OFDM) waveform is proposed to improve the OFDM technology. Compared with the OFDM waveform, the DFT-s-OFDM waveform has a lower PAPR and larger coverage.

Compared with the DFT-s-OFDM, the single-carrier waveform has advantages of a lower PAPR and lower complexity. The single-carrier waveform may be a single-carrier quadrature amplitude modulation (SC-QAM) waveform, a single-carrier frequency domain equalization (SC-FDE) waveform, or the like.

In a scenario in which the single-carrier waveform and the multi-carrier waveform coexist, how to perform processing is a technical problem to be urgently resolved.

SUMMARY

Embodiments of this application provide a signal transmission method and a communication apparatus, to implement signal sending and receiving with low complexity, and avoid device overheads resulting from installing two sets of transceivers in a scenario in which a single-carrier waveform and a multi-carrier waveform coexist.

A first aspect of the embodiments of this application provides a signal transmission method, including:
receiving first indication information from a network device, and determining transmission parameters corresponding to the first indication information; and
transmitting a signal based on the transmission parameters corresponding to the first indication information, where the transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

The method provided in the first aspect of the embodiments of this application may be performed by a terminal device, or may be performed by a component (for example, a processor, a chip, or a chip system) of a terminal device. In a scenario in which a single-carrier waveform and a multi-carrier waveform coexist, the network device and the terminal device may transmit the signal based on the specified transmission parameters, and may process both the single-carrier waveform and the multi-carrier waveform, so that the device can implement signal sending and receiving with low complexity, and avoid device overheads resulting from installing two sets of transceivers.

In an embodiment, the method further includes: receiving second indication information from the network device, where the second indication information is used to indicate the terminal device to transmit the signal based on transmission configuration information. It may be understood that the second indication information is used to indicate that the terminal device may transmit the signal by using the transmission configuration information.

The second indication information may be carried in downlink control information (DCI), RRC information, or media access control (MAC)-control element (CE) information.

For an uplink transmission process, to be specific, a process in which the terminal device sends an uplink signal to the network device based on transmission configuration information: The network device sends second indication information to the terminal device, where the second indication information is used to indicate the terminal device to send the uplink signal based on the transmission configuration information; the network device sends first indication information to the terminal device, where the first indication information is used to indicate transmission parameters to be used by the terminal device to send the uplink signal; when receiving the first indication information, the terminal device determines transmission parameters corresponding to the first indication information, and sends the uplink signal based on the transmission parameters; and the network device receives the uplink signal based on the transmission parameters corresponding to the first indication information.

The sending the uplink signal based on the transmission parameters corresponding to the first indication information may include: processing an uplink symbol based on the transmission parameters corresponding to the first indication information to obtain the uplink signal, and sending the uplink signal. The receiving the uplink signal based on the transmission parameters corresponding to the first indication information may include: processing the received uplink signal based on the transmission parameters corresponding to the first indication information to obtain an uplink symbol.

For a downlink transmission process, to be specific, a process in which the network device sends a downlink signal to the terminal device based on transmission configuration information: The network device sends second indication information to the terminal device, where the second indication information is used to indicate the terminal device to receive the downlink signal based on the transmission configuration information; the network device sends first indication information to the terminal device, where the first indication information is used to indicate transmission parameters used by the network device to send the downlink signal; and when receiving the downlink signal, the terminal device processes the downlink signal based on transmission parameters corresponding to the first indication information to obtain a downlink symbol.

In an embodiment, the terminal device may send capability information to the network device, where the capability information is used to indicate the terminal device to support transmission configuration information-based transmission, or the capability information is used to request for transmission configuration information-based transmission. The capability information may be carried in radio resource control (RRC) information or random access channel (RACH) sequence information.

The transmission configuration information may include a plurality of configuration indexes and transmission parameters corresponding to the configuration indexes. The transmission configuration information may be understood as a table, and the transmission parameters in the table may support signal transmission in a scenario in which the single-carrier waveform and the multi-carrier waveform coexist. Second indication information is used to indicate that the terminal device may transmit a signal by using transmission parameters included in the transmission configuration information. The capability information is used to indicate that the terminal device may support transmitting a signal by using the transmission parameters included in the transmission configuration information, or request to transmit a signal by using the transmission parameters included in the transmission configuration information.

In an embodiment, the first indication information is used to indicate one or more of the plurality of configuration indexes, and that the terminal device determines the transmission parameters corresponding to the first indication information is: determining a transmission bandwidth corresponding to the configuration index and an extended bandwidth corresponding to the configuration index. That is, the transmission parameters include the transmission bandwidth and the extended bandwidth.

Further, the transmission bandwidth and the extended bandwidth that correspond to the configuration index may be used to determine a filter parameter for transmitting the signal, to determine a filter shape. The filter parameter may be a roll-off factor, and the roll-off factor may also be described as an expansion factor, a shaping factor, or the like. For a configuration index, the roll-off factor=the extended bandwidth corresponding to the configuration index/(the transmission bandwidth corresponding to the configuration index+the extended bandwidth corresponding to the configuration index)=the extended bandwidth corresponding to the configuration index/a total bandwidth corresponding to the configuration index, where the total bandwidth corresponding to the configuration index=the extended bandwidth corresponding to the configuration index+the transmission bandwidth corresponding to the configuration index. In an embodiment, the transmission configuration information includes an association relationship between the transmission bandwidth and the extended bandwidth, and the transmission bandwidth and the extended bandwidth that correspond to the configuration index may be determined based on the association relationship between the transmission bandwidth and the extended bandwidth.

In an embodiment, the association relationship between the transmission bandwidth and the extended bandwidth is an association relationship between a quantity of subcarriers corresponding to the transmission bandwidth and a quantity of subcarriers corresponding to the extended bandwidth, and the association relationship between the quantity of subcarriers corresponding to the transmission bandwidth and the quantity of subcarriers corresponding to the extended bandwidth includes one or more of the following:

the quantity of subcarriers corresponding to the transmission bandwidth is 6144, and the quantity of subcarriers corresponding to the extended bandwidth is 1536, that is, in this case, the transmission bandwidth corresponds to 6144 subcarriers, and the extended bandwidth corresponds to 1536 subcarriers;

the quantity of subcarriers corresponding to the transmission bandwidth is 6144, and the quantity of subcarriers corresponding to the extended bandwidth is 684;

the quantity of subcarriers corresponding to the transmission bandwidth is 6144, and the quantity of subcarriers corresponding to the extended bandwidth is 672;

the quantity of subcarriers corresponding to the transmission bandwidth is 5120, and the quantity of subcarriers corresponding to the extended bandwidth is 1288;

the quantity of subcarriers corresponding to the transmission bandwidth is 5120, and the quantity of subcarriers corresponding to the extended bandwidth is 1276;

the quantity of subcarriers corresponding to the transmission bandwidth is 5120, and the quantity of subcarriers corresponding to the extended bandwidth is 580;

the quantity of subcarriers corresponding to the transmission bandwidth is 5120, and the quantity of subcarriers corresponding to the extended bandwidth is 568;

the quantity of subcarriers corresponding to the transmission bandwidth is 4096, and the quantity of subcarriers corresponding to the extended bandwidth is 1028;

the quantity of subcarriers corresponding to the transmission bandwidth is 4096, and the quantity of subcarriers corresponding to the extended bandwidth is 1016;

the quantity of subcarriers corresponding to the transmission bandwidth is 4096, and the quantity of subcarriers corresponding to the extended bandwidth is 464;

the quantity of subcarriers corresponding to the transmission bandwidth is 4096, and the quantity of subcarriers corresponding to the extended bandwidth is 452;

the quantity of subcarriers corresponding to the transmission bandwidth is 3072, and the quantity of subcarriers corresponding to the extended bandwidth is 768;

the quantity of subcarriers corresponding to the transmission bandwidth is 3072, and the quantity of subcarriers corresponding to the extended bandwidth is 348;

the quantity of subcarriers corresponding to the transmission bandwidth is 3072, and the quantity of subcarriers corresponding to the extended bandwidth is 336;

the quantity of subcarriers corresponding to the transmission bandwidth is 2560, and the quantity of subcarriers corresponding to the extended bandwidth is 644;

the quantity of subcarriers corresponding to the transmission bandwidth is 2560, and the quantity of subcarriers corresponding to the extended bandwidth is 632;

the quantity of subcarriers corresponding to the transmission bandwidth is 2560, and the quantity of subcarriers corresponding to the extended bandwidth is 296;

the quantity of subcarriers corresponding to the transmission bandwidth is 2560, and the quantity of subcarriers corresponding to the extended bandwidth is 284;

the quantity of subcarriers corresponding to the transmission bandwidth is 2048, and the quantity of subcarriers corresponding to the extended bandwidth is 520;

the quantity of subcarriers corresponding to the transmission bandwidth is 2048, and the quantity of subcarriers corresponding to the extended bandwidth is 508;

the quantity of subcarriers corresponding to the transmission bandwidth is 2048, and the quantity of subcarriers corresponding to the extended bandwidth is 232;
the quantity of subcarriers corresponding to the transmission bandwidth is 2048, and the quantity of subcarriers corresponding to the extended bandwidth is 220;
the quantity of subcarriers corresponding to the transmission bandwidth is 1536, and the quantity of subcarriers corresponding to the extended bandwidth is 384;
the quantity of subcarriers corresponding to the transmission bandwidth is 1536, and the quantity of subcarriers corresponding to the extended bandwidth is 180;
the quantity of subcarriers corresponding to the transmission bandwidth is 1536, and the quantity of subcarriers corresponding to the extended bandwidth is 168;
the quantity of subcarriers corresponding to the transmission bandwidth is 1280, and the quantity of subcarriers corresponding to the extended bandwidth is 328;
the quantity of subcarriers corresponding to the transmission bandwidth is 1280, and the quantity of subcarriers corresponding to the extended bandwidth is 316;
the quantity of subcarriers corresponding to the transmission bandwidth is 1280, and the quantity of subcarriers corresponding to the extended bandwidth is 148;
the quantity of subcarriers corresponding to the transmission bandwidth is 1280, and the quantity of subcarriers corresponding to the extended bandwidth is 136;
the quantity of subcarriers corresponding to the transmission bandwidth is 1024, and the quantity of subcarriers corresponding to the extended bandwidth is 260;
the quantity of subcarriers corresponding to the transmission bandwidth is 1024, and the quantity of subcarriers corresponding to the extended bandwidth is 248;
the quantity of subcarriers corresponding to the transmission bandwidth is 1024, and the quantity of subcarriers corresponding to the extended bandwidth is 104;
the quantity of subcarriers corresponding to the transmission bandwidth is 1024, and the quantity of subcarriers corresponding to the extended bandwidth is 116;
the quantity of subcarriers corresponding to the transmission bandwidth is 960, and the quantity of subcarriers corresponding to the extended bandwidth is 240;
the quantity of subcarriers corresponding to the transmission bandwidth is 960, and the quantity of subcarriers corresponding to the extended bandwidth is 96;
the quantity of subcarriers corresponding to the transmission bandwidth is 960, and the quantity of subcarriers corresponding to the extended bandwidth is 108;
the quantity of subcarriers corresponding to the transmission bandwidth is 768, and the quantity of subcarriers corresponding to the extended bandwidth is 192;
the quantity of subcarriers corresponding to the transmission bandwidth is 768, and the quantity of subcarriers corresponding to the extended bandwidth is 84;
the quantity of subcarriers corresponding to the transmission bandwidth is 768, and the quantity of subcarriers corresponding to the extended bandwidth is 96;
the quantity of subcarriers corresponding to the transmission bandwidth is 512, and the quantity of subcarriers corresponding to the extended bandwidth is 136;
the quantity of subcarriers corresponding to the transmission bandwidth is 512, and the quantity of subcarriers corresponding to the extended bandwidth is 124;
the quantity of subcarriers corresponding to the transmission bandwidth is 512, and the quantity of subcarriers corresponding to the extended bandwidth is 52;
the quantity of subcarriers corresponding to the transmission bandwidth is 512, and the quantity of subcarriers corresponding to the extended bandwidth is 64;
the quantity of subcarriers corresponding to the transmission bandwidth is 384, and the quantity of subcarriers corresponding to the extended bandwidth is 96;
the quantity of subcarriers corresponding to the transmission bandwidth is 384, and the quantity of subcarriers corresponding to the extended bandwidth is 48;
the quantity of subcarriers corresponding to the transmission bandwidth is 384, and the quantity of subcarriers corresponding to the extended bandwidth is 36;
the quantity of subcarriers corresponding to the transmission bandwidth is 320, and the quantity of subcarriers corresponding to the extended bandwidth is 88;
the quantity of subcarriers corresponding to the transmission bandwidth is 320, and the quantity of subcarriers corresponding to the extended bandwidth is 76;
the quantity of subcarriers corresponding to the transmission bandwidth is 320, and the quantity of subcarriers corresponding to the extended bandwidth is 40;
the quantity of subcarriers corresponding to the transmission bandwidth is 320, and the quantity of subcarriers corresponding to the extended bandwidth is 28;
the quantity of subcarriers corresponding to the transmission bandwidth is 256, and the quantity of subcarriers corresponding to the extended bandwidth is 56;
the quantity of subcarriers corresponding to the transmission bandwidth is 256, and the quantity of subcarriers corresponding to the extended bandwidth is 68;
the quantity of subcarriers corresponding to the transmission bandwidth is 256, and the quantity of subcarriers corresponding to the extended bandwidth is 32;
the quantity of subcarriers corresponding to the transmission bandwidth is 256, and the quantity of subcarriers corresponding to the extended bandwidth is 20;
the quantity of subcarriers corresponding to the transmission bandwidth is 192, and the quantity of subcarriers corresponding to the extended bandwidth is 48;
the quantity of subcarriers corresponding to the transmission bandwidth is 192, and the quantity of subcarriers corresponding to the extended bandwidth is 24;
the quantity of subcarriers corresponding to the transmission bandwidth is 192, and the quantity of subcarriers corresponding to the extended bandwidth is 12;
the quantity of subcarriers corresponding to the transmission bandwidth is 160, and the quantity of subcarriers corresponding to the extended bandwidth is 32;
the quantity of subcarriers corresponding to the transmission bandwidth is 160, and the quantity of subcarriers corresponding to the extended bandwidth is 44;
the quantity of subcarriers corresponding to the transmission bandwidth is 160, and the quantity of subcarriers corresponding to the extended bandwidth is 8;
the quantity of subcarriers corresponding to the transmission bandwidth is 160, and the quantity of subcarriers corresponding to the extended bandwidth is 20;
the quantity of subcarriers corresponding to the transmission bandwidth is 128, and the quantity of subcarriers corresponding to the extended bandwidth is 28;
the quantity of subcarriers corresponding to the transmission bandwidth is 128, and the quantity of subcarriers corresponding to the extended bandwidth is 40;
the quantity of subcarriers corresponding to the transmission bandwidth is 128, and the quantity of subcarriers corresponding to the extended bandwidth is 4;

the quantity of subcarriers corresponding to the transmission bandwidth is 128, and the quantity of subcarriers corresponding to the extended bandwidth is 16;

the quantity of subcarriers corresponding to the transmission bandwidth is 96, and the quantity of subcarriers corresponding to the extended bandwidth is 24;

the quantity of subcarriers corresponding to the transmission bandwidth is 96, and the quantity of subcarriers corresponding to the extended bandwidth is 12;

the quantity of subcarriers corresponding to the transmission bandwidth is 80, and the quantity of subcarriers corresponding to the extended bandwidth is 16;

the quantity of subcarriers corresponding to the transmission bandwidth is 80, and the quantity of subcarriers corresponding to the extended bandwidth is 4;

the quantity of subcarriers corresponding to the transmission bandwidth is 64, and the quantity of subcarriers corresponding to the extended bandwidth is 20;

the quantity of subcarriers corresponding to the transmission bandwidth is 64, and the quantity of subcarriers corresponding to the extended bandwidth is 8;

the quantity of subcarriers corresponding to the transmission bandwidth is 48, and the quantity of subcarriers corresponding to the extended bandwidth is 12;

the quantity of subcarriers corresponding to the transmission bandwidth is 40, and the quantity of subcarriers corresponding to the extended bandwidth is 8;

the quantity of subcarriers corresponding to the transmission bandwidth is 32, and the quantity of subcarriers corresponding to the extended bandwidth is 16; or the quantity of subcarriers corresponding to the transmission bandwidth is 32, and the quantity of subcarriers corresponding to the extended bandwidth is 4.

It can be learned from the enumerated association relationships that the quantity of subcarriers corresponding to the transmission bandwidth may be an integer multiple of 12, or may not be an integer multiple of 12. Therefore, this application has a wide application scope and is flexible. The enumerated association relationships may enable a symbol periodicity of a single-carrier symbol to be aligned with a symbol periodicity of a multi-carrier symbol, to implement multiplexing of the single-carrier waveform and the multi-carrier waveform.

Based on the enumerated association relationships, the table corresponding to the transmission configuration information may include two columns of transmission parameters corresponding to the configuration indexes, which are respectively the transmission bandwidth and the extended bandwidth. For values of the transmission bandwidth and the extended bandwidth that correspond to the configuration indexes in the table, refer to the enumerated association relationships.

In an embodiment, the association relationship between the transmission bandwidth and the extended bandwidth is that a sum of a quantity of subcarriers corresponding to the transmission bandwidth and a quantity of subcarriers corresponding to the extended bandwidth is an integer multiple of 12, and the quantity of subcarriers corresponding to the transmission bandwidth is $a*2^n$, where a is a positive integer, and n is a positive integer. It may be understood that, this application is also applicable to a case in which the quantity of subcarriers corresponding to the transmission bandwidth is not an integer multiple of 12, provided that the quantity of subcarriers corresponding to the total bandwidth is an integer multiple of 12. Therefore, this application has a wider application scope and is more flexible.

In an embodiment, the transmission configuration information further includes an association relationship between the transmission bandwidth and a symbol rate, and the association relationship between the transmission bandwidth and the symbol rate is that the symbol rate=a quantity of subcarriers corresponding to the transmission bandwidth*a subcarrier spacing, that is, the symbol rate is a product of the quantity of subcarriers corresponding to the transmission bandwidth and the subcarrier spacing. When the transmission bandwidth is known, the symbol rate can be determined based on the association relationship; when the symbol rate is known, the transmission bandwidth can be determined based on the association relationship.

In an embodiment, the transmission configuration information further includes an oversampling multiple, where the oversampling multiple=a sampling rate/a symbol rate=an upsampling multiple/a downsampling multiple, the upsampling multiple and the downsampling multiple are integers, the downsampling multiple is greater than or equal to 1, and the upsampling multiple is greater than the downsampling multiple. Therefore, the oversampling multiple is greater than 1. In an embodiment, the upsampling multiple is $2^m$, and m is a positive integer. If the terminal device sends the uplink signal by using the single-carrier waveform, the upsampling multiple and the downsampling multiple may be determined based on the oversampling multiple, so that the uplink symbol can be processed by using a single-carrier waveform processing procedure to obtain the uplink signal.

It should be noted that, when the downsampling multiple is 1, a downsampling operation is not performed by default, that is, downsampling is not performed.

In an embodiment, the transmission configuration information further includes an association relationship between the transmission bandwidth or the extended bandwidth and the total bandwidth, and the association relationship between the transmission bandwidth or the extended bandwidth and the total bandwidth is that the total bandwidth=the transmission bandwidth+the extended bandwidth.

In an embodiment, the transmission parameters include the transmission bandwidth and the total bandwidth. The transmission configuration information includes an association relationship between the transmission bandwidth and the total bandwidth, and the terminal device may determine, based on the association relationship between the transmission bandwidth and the total bandwidth, the transmission bandwidth and the total bandwidth that correspond to the configuration index. For the association relationship between the transmission bandwidth and the total bandwidth, refer to Table 3 in Embodiment 2.

In an embodiment, the transmission parameters include the extended bandwidth and the total bandwidth. The transmission configuration information includes an association relationship between the extended bandwidth and the total bandwidth, and the terminal device may determine, based on the association relationship between the extended bandwidth and the total bandwidth, the extended bandwidth and the total bandwidth that correspond to the configuration index. For the association relationship between the extended bandwidth and the total bandwidth, refer to Table 4 in Embodiment 3.

In an embodiment, the transmission parameters include the extended bandwidth and the symbol rate. The transmission configuration information includes an association relationship between the extended bandwidth and the symbol rate, and the terminal device may determine, based on the association relationship between the extended bandwidth and the symbol rate, the extended bandwidth and the symbol rate that correspond to the configuration index. For the association relationship between the extended bandwidth and the symbol rate, refer to Table 5 in Embodiment 4.

In an embodiment, the transmission parameters include the total bandwidth and the symbol rate. The transmission configuration information includes an association relationship between the total bandwidth and the symbol rate, and the terminal device may determine, based on the association relationship between the total bandwidth and the symbol rate, the total bandwidth and the symbol rate that correspond to the configuration index. For the association relationship between the total bandwidth and the symbol rate, refer to Table 6 in Embodiment 5.

A second aspect of the embodiments of this application provides a signal transmission method, including:

sending second indication information to a terminal device, where the second indication information is used to indicate the terminal device to transmit a signal based on transmission configuration information; and sending first indication information to the terminal device, where the first indication information is used to indicate the terminal device to determine transmission parameters corresponding to the first indication information, the transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

The transmission configuration information may include a plurality of configuration indexes and transmission parameters corresponding to the configuration indexes, and the first indication information is used to indicate one or more of the plurality of configuration indexes.

The method provided in the second aspect of the embodiments of this application may be performed by a network device, or may be performed by a component (for example, a processor, a chip, or a chip system) of a network device. The network device notifies, by using the second indication information, the terminal device that the transmission configuration information can be used, and notifies, by using the first indication information, the terminal device of transmission parameters to be used to send an uplink signal or receive a downlink signal. In a scenario in which a single-carrier waveform and a multi-carrier waveform coexist, the network device and the terminal device may transmit the signal based on the transmission configuration information, and may process both the single-carrier waveform and the multi-carrier waveform, so that the device can implement signal sending and receiving with low complexity, and avoid device overheads resulting from installing two sets of transceivers.

In an embodiment, for downlink transmission, that the network device sends a downlink signal based on the transmission parameters corresponding to the first indication information may be understood as that the network device processes a downlink symbol by using the transmission parameters corresponding to the first indication information to obtain the downlink signal, and sends the downlink signal; for uplink transmission, that the network device receives an uplink signal based on the transmission parameters corresponding to the first indication information may be understood as that the network device processes a received uplink signal by using the transmission parameters corresponding to the first indication information, to restore an uplink symbol before being processed by the terminal device by using the transmission parameters corresponding to the first indication information.

In an embodiment, capability information is received from the terminal device, where the capability information is used to indicate the terminal device to support transmission configuration information-based transmission, or the capability information is used to request for transmission configuration information-based transmission. When receiving the capability information, the network device may send the first indication information to the terminal device, so that the terminal device determines the transmission parameters corresponding to the first indication information.

A third aspect of the embodiments of this application provides a communication apparatus. The communication apparatus may be a terminal device, an apparatus in a terminal device, or an apparatus that can be used together with a terminal device. The communication apparatus has some or all functions of the terminal device in the method example in the first aspect. For example, the functions of the terminal device may include functions in some or all of the embodiments of this application, or may include a function of separately implementing any embodiment of this application. The function may be implemented by hardware, or may be implemented by hardware executing corresponding software. The hardware or the software includes one or more units or modules corresponding to the foregoing function.

In an embodiment, a structure of the terminal device may include a processing unit and a transceiver unit. The processing unit is configured to support the terminal device in performing a corresponding function in the method provided in the first aspect. The transceiver unit is configured to support communication between the terminal device and another device, and the another device may be a network device. The terminal device may further include a storage unit. The storage unit is configured to be coupled to the processing unit and the transceiver unit, and stores program instructions and data that are necessary for the terminal device.

In an embodiment, the terminal device includes a processing unit and a transceiver unit.

The transceiver unit is configured to receive first indication information from the network device.

The processing unit is configured to: determine transmission parameters corresponding to the first indication information, and transmit a signal based on the transmission parameters corresponding to the first indication information.

The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

For example, the processing unit may be a processor, the transceiver unit be a transceiver, and the storage unit may be a memory.

In an embodiment, the terminal device includes a processor and a transceiver.

The transceiver is configured to receive first indication information from the network device.

The processor is configured to: determine transmission parameters corresponding to the first indication information, and transmit a signal based on the transmission parameters corresponding to the first indication information.

The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

In an implementation process, the processor may be configured to perform the method provided in the first aspect, for example, but not limited to, baseband related processing, and the transceiver may be configured to perform, for example, but not limited to, radio frequency sending and receiving. The foregoing components may be separately disposed on chips independent of each other, or at least some or all of the components may be disposed on one chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components can be integrated on a same chip. For example, the digital baseband processor and a plurality of application processors (for example, but not limited to, a graphics processor and a multimedia processor) may be integrated on a same chip. The chip may be referred to as a system on chip (system on chip). Whether all the components are separately disposed on different chips or integrated and disposed on one or more chips usually depends on a requirement for a product design. Implementations of the foregoing components are not limited in an embodiment of the application.

A fourth aspect of the embodiments of this application provides a processor configured to perform the method provided in the first aspect. In a process of performing the method provided in the first aspect, a process of sending the information or data and receiving the information or data may be understood as a process in which the processor outputs the information or data and a process in which the processor receives the input information or data, when outputting the information or data, the processor outputs the information or data to a transceiver, so that the transceiver transmits the information or data. Further, after the information or data is output by the processor, other processing may further need to be performed on the information or data before the information or data arrives at the transceiver. Similarly, when the processor receives the input information or data, the transceiver receives the information or data and inputs the information or data into the processor. Further, after the transceiver receives the information or data, other processing may need to be performed on the information or data before the information or data is input into the processor.

Based on the foregoing principle, for example, the receiving indication information mentioned in the method provided in the first aspect may be understood as that the transceiver inputs the received indication information into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In an implementation process, the processor may be a processor specially configured to perform these methods, or a processor, for example, a general purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in an embodiment of the application.

A fifth aspect of the embodiments of this application provides a chip system. The chip system includes a processor and an interface. The chip system may be deployed in a terminal device.

In an embodiment, the interface is configured to receive first indication information; and the processor is configured to: determine transmission parameters corresponding to the first indication information, process an uplink symbol based on the transmission parameters corresponding to the first indication information to obtain an uplink signal, and output the uplink signal. The interface is further configured to receive a downlink signal, and the processor is further configured to process the downlink signal based on the transmission parameters corresponding to the first indication information to obtain a downlink symbol. The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

The interface is further configured to receive second indication information, where the second indication information is used to indicate the processor to transmit the signal based on transmission configuration information. The interface is further configured to send capability information, where the capability information is used to indicate the processor to support transmission configuration information-based transmission, or is used to request for transmission configuration information-based transmission. The transmission configuration information may include a plurality of configuration indexes and transmission parameters corresponding to the configuration indexes.

In an embodiment, the processor is configured to invoke, from a memory, and run a computer program stored in the memory, to support the terminal device in implementing the function in the first aspect, for example, determining the transmission parameters corresponding to the first indication information. In an embodiment, the chip system further includes a memory. The memory is configured to store program instructions and data that are necessary for the terminal device. The chip system may include a chip, or may include a chip and another discrete component.

A sixth aspect of the embodiments of this application provides a computer-readable storage medium, configured to store computer software instructions used by the foregoing terminal device. The computer software instructions include a program configured to perform the method according to the first aspect.

A seventh aspect of the embodiments of this application provides a computer program product including instructions. When the computer program product runs on a computer, the computer is enabled to perform the method according to the first aspect.

An eighth aspect of the embodiments of this application provides a computer program including instructions. When the computer program is run on a computer, the computer is enabled to perform the method according to the first aspect.

A ninth aspect of the embodiments of this application provides a communication apparatus. The communication apparatus may be a network device, an apparatus in a network device, or an apparatus that can be used together with a network device. The communication apparatus has some or all functions of the network device in the method example in the second aspect. For example, the functions of the network device may include functions in some or all of the embodiments of this application, or may include a function of separately implementing any embodiment of this application. The function may be implemented by hardware, or may be implemented by hardware executing corresponding software. The hardware or the software includes one or more units or modules corresponding to the foregoing function.

In an embodiment, a structure of the network device may include a processing unit and a transceiver unit. The processing unit is configured to support the network device in performing a corresponding function in the method provided in the second aspect. The transceiver unit is configured to support communication between the network device and another device, and the another device may be a terminal device. The network device may further include a storage unit. The storage unit is configured to be coupled to the processing unit and the transceiver unit, and stores program instructions and data that are necessary for the network device.

In an embodiment, the network device includes a transceiver unit.

The transceiver unit sends second indication information to a terminal device, where the second indication information is used to indicate the terminal device to transmit a signal based on transmission configuration information; and sends first indication information to the terminal device, where the first indication information is used to indicate the terminal device to determine transmission parameters corresponding to the first indication information.

For example, the processing unit may be a processor, the transceiver unit be a transceiver, and the storage unit may be a memory.

In an embodiment, the network device includes a transceiver.

The transceiver sends second indication information to a terminal device, where the second indication information is used to indicate the terminal device to transmit a signal based on transmission configuration information; and sends first indication information to the terminal device, where the first indication information is used to indicate the terminal device to determine transmission parameters corresponding to the first indication information.

The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

The transmission configuration information may include a plurality of configuration indexes and transmission parameters corresponding to the configuration indexes, and the first indication information is used to indicate one or more of the plurality of configuration indexes.

A tenth aspect of the embodiments of this application provides a processor configured to perform the method provided in the second aspect. In a process of performing the method provided in the second aspect, a process of sending the information or data and receiving the information or data may be understood as a process in which the processor outputs the information or data and a process in which the processor receives the input information or data. For example, when outputting the information or data, the processor outputs the information or data to a transceiver, so that the transceiver transmits the information or data. Further, after the information or data is output by the processor, other processing may further need to be performed on the information or data before the information or data arrives at the transceiver. Similarly, when the processor receives the input information or data, the transceiver receives the information or data and inputs the information or data into the processor. Further, after the transceiver receives the information or data, other processing may need to be performed on the information or data before the information or data is input into the processor.

An eleventh aspect of the embodiments of this application provides a chip system. The chip system includes a processor and an interface. The processor is configured to invoke, from a memory, and run a computer program stored in the memory, to support a network device in implementing a function in the second aspect. In an embodiment, the chip system further includes a memory. The memory is configured to store program instructions and data that are necessary for a terminal device. The chip system may include a chip, or may include a chip and another discrete component.

A twelfth aspect of the embodiments of this application provides a computer-readable storage medium, configured to store computer software instructions used by the foregoing network device. The computer software instructions include a program configured to perform the method according to the second aspect.

A thirteenth aspect of the embodiments of this application provides a computer program product including instructions. When the computer program product runs on a computer, the computer is enabled to perform the method according to the second aspect.

A fourteenth aspect of the embodiments of this application provides a computer program including instructions. When the computer program runs on a computer, the computer is enabled to perform the method according to the second aspect.

A fifteenth aspect of the embodiments of this application provides a system. The system includes a terminal device and a network device. For uplink transmission, the terminal device may send an uplink signal by using a single-carrier waveform, and the network device may receive the uplink signal by using a multi-carrier waveform; or the terminal device may send an uplink signal by using a multi-carrier waveform, and the network device may receive the uplink signal by using a single-carrier waveform. For downlink transmission, the network device may send a downlink signal by using the single-carrier waveform, and the terminal device may receive the downlink signal by using the multi-carrier waveform; or the network device may send a downlink signal by using the multi-carrier waveform, and the terminal device may receive the downlink signal by using the single-carrier waveform.

DESCRIPTION OF EMBODIMENTS

Before the embodiments of this application are described, the following first describes names or terms in the embodiments of this application.

(1) Multi-Carrier Waveform

An OFDM waveform is a typical multi-carrier waveform, and has a problem of high PAPR. In high frequency communication, power amplification is limited. Consequently, performance is poor in an insufficient coverage scenario. The power amplification may be referred to as PA for short.

A DFT-s-OFDM technology is a single-carrier technology based on the OFDM waveform, and can be used to reduce the PAPR. Compared with the OFDM waveform, a DFT-s-OFDM waveform provides higher output power and higher power amplification efficiency at a same power amplification level, so that coverage can be improved and energy consumption can be reduced. Currently, in a long term evolution (LTE) system and a 5th generation (5G) (or referred to as a new radio (NR)) communication system, the DFT-s-OFDM waveform may be applied to uplink transmission. However, in high frequency communication, because a capability of a component is limited and a PAPR problem is serious, the DFT-s-OFDM waveform may also be applied to downlink transmission. A frequency band for high frequency communication may be 24250 MHz to 52600 MHz in the NR system, may be a frequency band higher than 52600 MHz supported by a subsequently evolved NR system, or may be a higher frequency band, for example, a terahertz (THz) frequency band, in a next-generation communication system.

The DFT-s-OFDM technology has discrete Fourier transform (DFT) processing before OFDM processing. Therefore, the DFT-s-OFDM technology may also be referred to as a linear precoding OFDM technology.

Figure 1:
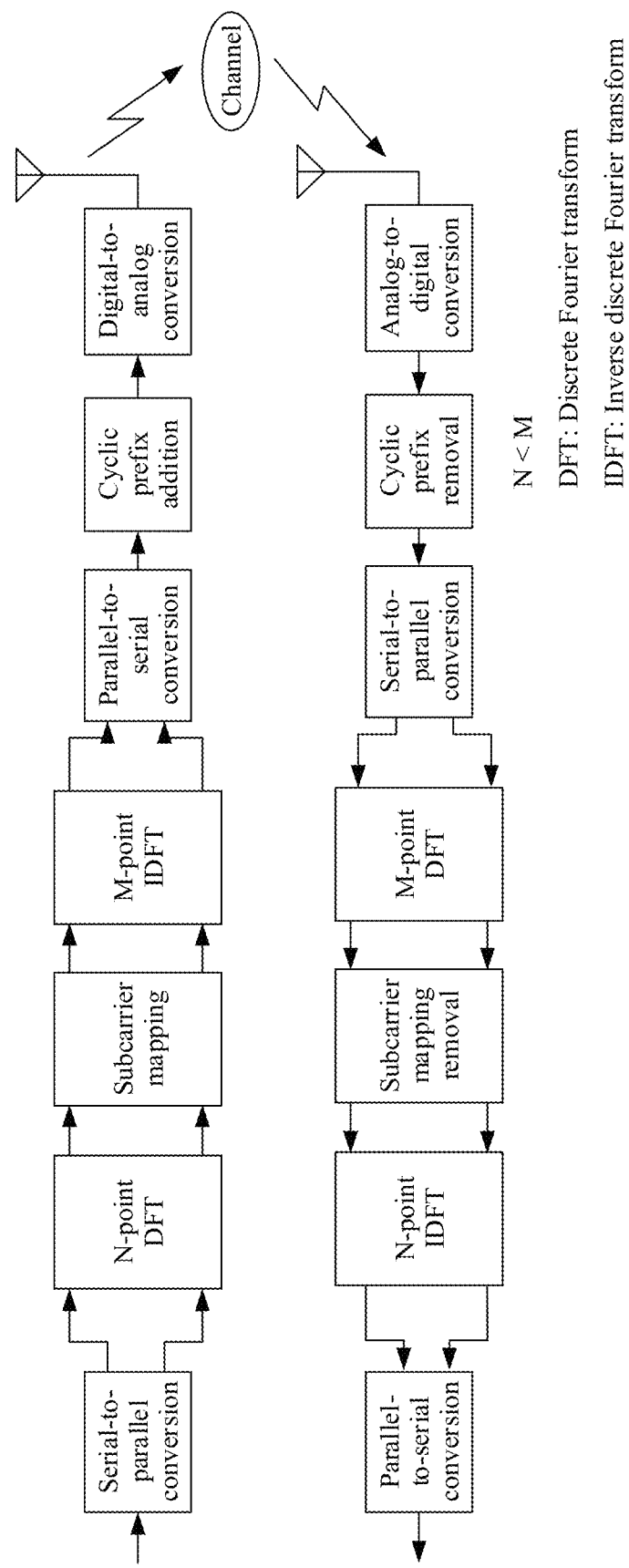
FIG. 1 is a schematic diagram of a processing procedure of a DFT-s-OFDM technology.

FIG. 1 is a schematic diagram of a processing procedure of the DFT-s-OFDM technology. A transmit end sequentially performs the following processing on a time domain discrete sequence: serial-to-parallel (serial-to-parallel) conversion, N-point discrete Fourier transform (DFT), subcarrier mapping, M-point inverse discrete Fourier transform (IDFT), parallel-to-serial conversion, cyclic prefix (CP) addition, and digital-to-analog conversion (DAC) processing; and then sends a signal through an antenna port and a channel (channel). When receiving the signal through the channel and the antenna port, a receive end sequentially performs the following processing on the signal: analog-to-digital conversion (ADC), cyclic prefix removal, serial-to-parallel conversion, M-point DFT, subcarrier mapping removal, N-point IDFT, and parallel-to-serial conversion, to obtain the time domain discrete sequence.

The transmit end can obtain a frequency domain sequence of the time domain discrete sequence through N-point DFT. After subcarrier mapping is performed on the frequency domain sequence, IDFT is input to perform M-point IDFT, where N<M. Because a length of the IDFT is greater than a length of the DFT, a part that is in the IDFT and by which the length of the IDFT exceeds the length of the DFT is filled with zeros when being input. After IDFT is performed, the cyclic prefix is added to avoid symbol interference.

(2) Single-Carrier Waveform

An SC-QAM waveform is a common single-carrier waveform, and is widely used in a communication system such as a 2nd generation (2G) mobile communication system and a Wi-Fi system.

Figure 2:
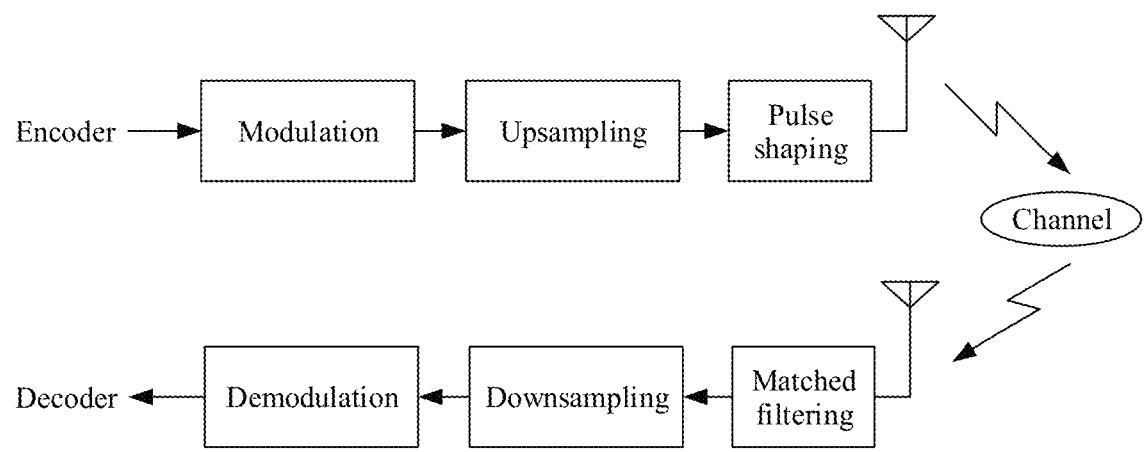
FIG. 2 is a schematic diagram of a processing procedure of an SC-QAM technology.

FIG. 2 is a schematic diagram of a processing procedure of the SC-QAM technology. A transmit end sequentially performs modulation, upsampling, and pulse shaping processing on a signal encoded by an encoder, and finally sends the processed signal through a radio frequency component and an antenna port. A receive end receives the signal from the transmit end by using the antenna port and the radio frequency component, sequentially performs matched filtering, downsampling, and demodulation processing on the received signal, and inputs the processed signal to a decoder for decoding.

It may be learned from FIG. 2 that both sending and receiving processing in the SC-QAM technology are completed in time domain, involves time domain matched filtering, upsampling, and downsampling, and does not involve time domain-frequency domain transform, that is, does not involve a DFT, fast Fourier transform (FFT), IDFT, or fast inverse discrete Fourier transform (IFFT) process. Therefore, compared with the multi-carrier waveform, the SC-QAM waveform has advantages of low complexity and a low PAPR.

To obtain a diversity gain of a single carrier in frequency domain, resist performance deterioration caused by multipath interference, or increase complexity of time domain equalization, an SC-FDE technology is proposed based on the SC-QAM technology.

Figure 3:
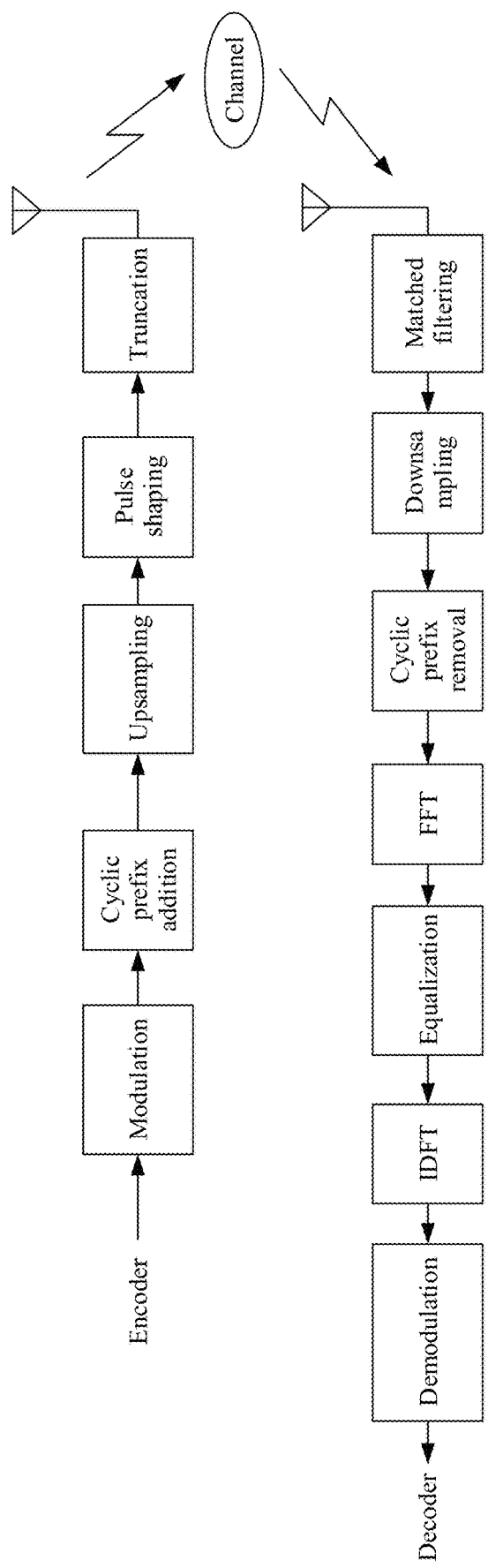
FIG. 3 is a schematic diagram of a processing procedure of an SC-FDE technology.

FIG. 3 is a schematic diagram of a processing procedure of the SC-FDE technology. A transmit end sequentially performs modulation, cyclic prefix addition, upsampling, pulse shaping, and truncation processing on a signal encoded by an encoder, and finally sends the processed signal through a radio frequency component and an antenna port. A receive end receives the signal from the transmit end through the antenna port and the radio frequency component, sequentially performs matched filtering, downsampling, cyclic prefix removal, FFT, equalization, IDFT, and demodulation processing on the received signal, and inputs the processed signal to a decoder for decoding.

In FIG. 3, the transmit end may resist multipath interference by adding a cyclic prefix. The receive end performs FFT processing on the received signal, so that a time domain signal is converted into a frequency domain signal. After channel estimation and equalization processing is performed on the frequency domain signal, and channel impact is eliminated, the frequency domain signal is converted into the time domain signal by using IDFT processing, to obtain a constellation symbol. The SC-FDE technology enables a single-carrier system to have a capability of processing a plurality of pieces of data simultaneously, and can overcome the impact of a multipath channel on system performance.

Currently, in a scenario in which the multi-carrier waveform and the single-carrier waveform coexist, the multi-carrier waveform corresponds to one type of transceiver, the single-carrier waveform corresponds to one type of transceiver, and the two types of transceivers have different parameters. For example, if the transmit end sends a signal in the multi-carrier waveform, when learning that the received signal is a signal in the multi-carrier waveform, the receive end performs receiving processing on the signal in the multi-carrier waveform by using a parameter corresponding to the multi-carrier transceiver; if the transmit end sends a signal in the single-carrier waveform, when learning that the received signal is a signal of the single-carrier waveform, the receive end performs receiving processing on the signal of the single-carrier waveform by using a parameter corresponding to the single-carrier transceiver.

For example, in an Institute of Electrical and Electronics Engineers (IEEE) 802.11 ad protocol or an IEEE 802.11 ay protocol, the SC-QAM waveform and the OFDM waveform may be compatible. In the IEEE 802.11 ad or IEEE 802.11 ay protocol, a symbol periodicity (including a cyclic prefix) of an OFDM symbol is 0.242 microseconds (µs), and a symbol periodicity of a single-carrier symbol is 0.292 µs. It can be learned that, to separately ensure flexibility of a multi-carrier system and a single-carrier system, the protocol separately designs parameters for the OFDM symbol and the single-carrier symbol. Therefore, symbol periodicities of the OFDM symbol and the single-carrier symbol are different.

It can be learned that, currently, in the scenario in which the multi-carrier waveform and the single-carrier waveform coexist, the two waveforms respectively correspond to a set of transmit and receive parameters. It may be understood that two sets of transmit and receive parameters are required in this scenario, which is complex and has high costs. In view of this, an embodiment of this application provides a signal transmission method and a communication apparatus that are in a multi-waveform scenario, to process both a single-carrier waveform and a multi-carrier waveform. In this way, in the scenario in which the multi-carrier waveform and the single-carrier waveform coexist, a device can implement signal sending and receiving with low complexity, and avoid device overheads resulting from installing two sets of transceivers. The multi-waveform scenario may include the scenario in which the multi-carrier waveform and the single-carrier waveform coexist, for example, a scenario in which an SC-QAM waveform and a DFT-s-OFDM waveform coexist.

Figure 4:
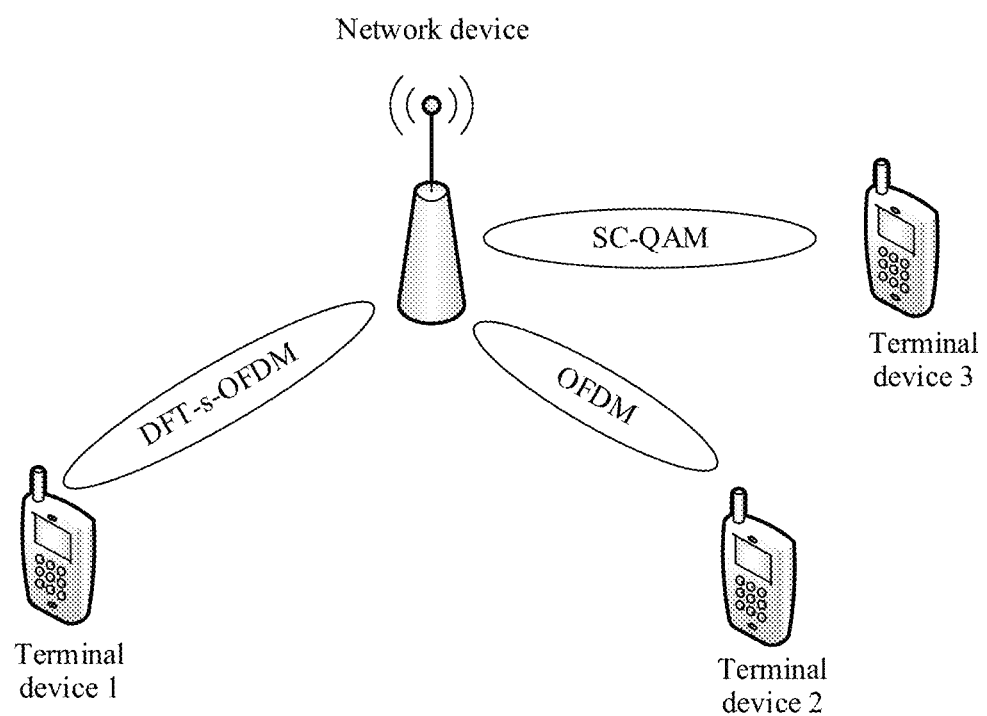
FIG. 4 is a schematic diagram of a network architecture to which an embodiment of this application is applied.

FIG. 4 is a schematic diagram of a network architecture to which an embodiment of this application is applied. The network architecture shown in FIG. 4 includes one network device and three terminal devices. A DFT-s-OFDM waveform is used between a terminal device 1 and the network device, an OFDM waveform is used between a terminal device 2 and the network device, and an SC-QAM waveform is used between a terminal device 3 and the network device. The terminal device 1, the terminal device 2, and the terminal device 3 are not limited to communicating with the network device by using one waveform. For example, in addition to the DFT-s-OFDM waveform, the terminal device 1 and the network device may further use the SC-QAM waveform.

It may be understood that an embodiment of the application may be applied to a wireless communication system in which the multi-carrier waveform and the single-carrier waveform coexist. The wireless communication system may include but is not limited to a long term evolution (LTE) system, an NR system, a future communication system, and the like. The future communication system may be, for example, a future network or a sixth generation communication system.

It should be noted that a quantity of devices, forms of the devices, and three waveforms shown in FIG. 4 are used as examples, and do not constitute a limitation on an embodiment of the application. For example, in an actual application, two or more network devices may be included.

In an embodiment of the application, the network device may be any device having a wireless transceiver function, including but not limited to: an evolved NodeB (evolved Node base station, NodeB, eNB, or e-NodeB) in LTE, a base station (for example: next-generation Node base station, gNodeB, or gNB) or a transmission reception point (TRP) in NR, a subsequently evolved base station in 3GPP, an access node in a Wi-Fi system, a wireless relay node, a wireless backhaul node, and the like. The base station may be a macro base station, a micro base station, a picocell base station, a small cell, a relay station, a balloon station, or the like. A plurality of base stations may support networks of a same technology mentioned above, or may support networks of different technologies mentioned above. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with the terminal, or may communicate with the terminal by using a relay station.

In an embodiment of the application, the terminal device is a device having a wireless transceiver function, and may be deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal device may be a mobile phone, a tablet computer (Pad), a computer with wireless receiving and sending functions, a virtual reality (VR) terminal device, an augmented reality (AR) terminal device, a wireless terminal in industrial control, a vehicle-mounted terminal device, a wireless terminal in self driving, a wireless terminal in telemedicine, a wireless terminal in a smart grid, a wireless terminal in transportation safety, a wireless terminal in a smart city, a wireless terminal in a smart home, a wearable terminal device, or the like. An application scenario is not limited in an embodiment of the application. The terminal device sometimes may also be referred to as a terminal, user equipment (UE), an access terminal device, a vehicle-mounted terminal, an industrial control terminal, a UE unit, a UE station, a mobile station, a remote station, a remote terminal device, a mobile device, a UE agent, a UE apparatus, or the like. The terminal device may alternatively be fixed or movable.

An embodiment of the application may be applied to a device to device system, a machine to machine (M2M) system, a vehicle to everything (V2X) system, and the like.

An embodiment of the application may be applied to a next-generation microwave scenario, an NR-based microwave backhaul or integrated access backhaul (IAB) scenario, or the like.

An embodiment of the application may be applied to an uplink transmission scenario, that is, a scenario in which the terminal device sends an uplink signal to the network device; and may also be applied to a downlink transmission scenario, that is, a scenario in which the network device sends a downlink signal to the terminal device.

A network architecture and a service scenario that are described in an embodiment of the application are intended to describe the technical solutions in an embodiment of the application more clearly, and do not constitute a limitation on the technical solutions provided in an embodiment of the application. One of ordinary skilled in the art may know that, with evolution of the network architecture and emergence of new service scenarios, the technical solutions provided in an embodiment of the application are also applicable to similar technical problems.

Based on the network architecture shown in FIG. 4, the following describes in detail a signal transmission method provided in an embodiment of this application. In a description process, a name of information exchanged between the network device and the terminal device is used as an example, and does not constitute a limitation on an embodiment of the application.

Figure 5:
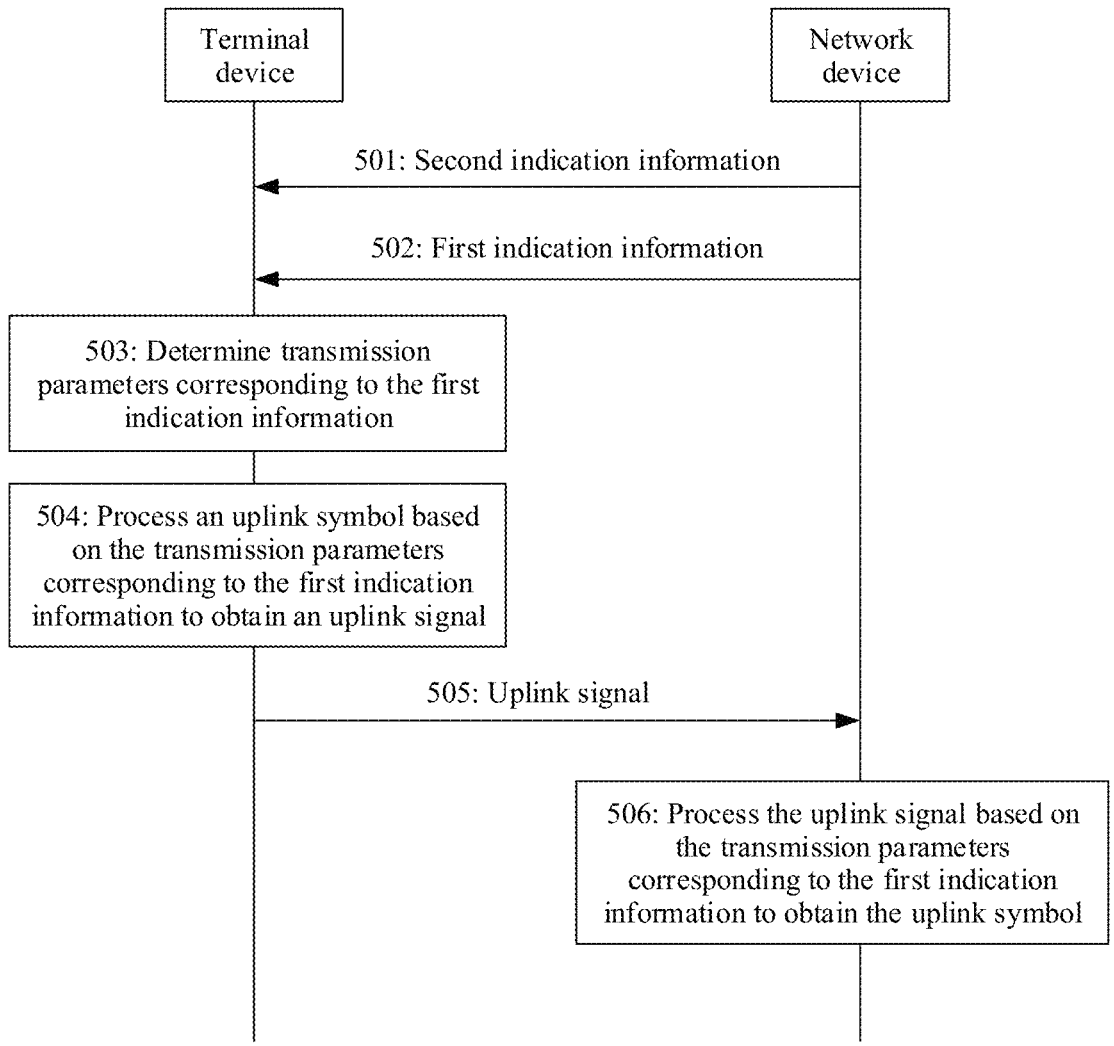
FIG. 5 is a schematic flowchart of a signal transmission method according to an embodiment of this application.

FIG. 5 is a schematic flowchart of a signal transmission method according to an embodiment of this application. The method may include but is not limited to the following operations.

Operation 501: A network device sends second indication information to a terminal device. Correspondingly, the terminal device receives the second indication information from the network device.

A transmission status may be defined in this application. In the transmission status, the network device and the terminal device may perform transmission by using transmission configuration information. A transmission bandwidth and an extended bandwidth that are supported by the transmission status are limited, that is, a transmission bandwidth and an extended bandwidth that are included in the transmission configuration information are supported. It may be understood that the transmission status is a transmission status defined for a scenario in which a single-carrier waveform and a multi-carrier waveform coexist. To distinguish the transmission status from another transmission status, the transmission status may be referred to as a transmission status, a low power consumption transmission status, a large bandwidth transmission status, a single-carrier-multi-carrier transmission status, a multiplex transmission status, or the like.

The transmission status is also defined by the network device, and the network device may configure the transmission status for the terminal device. Alternatively, the transmission status may be preconfigured, that is, the network device and the terminal device may preconfigure the transmission status, for example, configure the transmission status at delivery.

In the transmission status, the single-carrier waveform and the multi-carrier waveform may correspond to a set of transmission parameters, or may be described as corresponding to a set of transceiver mechanism or transceivers. In this case, the transmit end sends a signal in the single-carrier waveform (that is, a signal obtained through a single-carrier waveform processing procedure), and by using the transceiver mechanism, the receive end may process the received signal by using a multi-carrier waveform processing procedure. Alternatively, the transmit end sends a signal in the multi-carrier waveform (that is, a signal obtained through a multi-carrier waveform processing procedure), and by using the transceiver mechanism, the receive end may process the received signal by using a single-carrier waveform processing procedure. The transmit end may be the terminal device, and the receive end may be the network device. Alternatively, the transmit end may be the network device, and the receive end may be the terminal device. In the transmission status, a set of transceivers do not need to be deployed for each of the single-carrier waveform and the multi-carrier waveform, and only one set of transceivers need to be deployed, so that device overheads can be reduced.

The network device sends the second indication information to the terminal device, where the second indication information is used to indicate the terminal device to send a signal based on the transmission configuration information. For example, the second indication information is used to indicate the terminal device to transmit an uplink signal or receive a downlink signal based on the transmission configuration information. It may be understood that the second indication information is used to notify the terminal device to transmit the signal by using the transmission configuration information, that is, notify the terminal device to transmit the signal in the transmit status. The second indication information may be described as transmission status indication information, low power consumption transmission status indication information, single-carrier-multi-carrier transmission status indication information, and the like.

The network device may send the second indication information to the terminal device by using DCI, RRC information, or MAC CE information. Alternatively, the network device may send the second indication information to the terminal device by using information broadcast through a physical broadcast channel (PBCH), that is, the network device broadcasts the second indication information to a terminal device within coverage of the network device. Alternatively, the network device may not perform operation 501. It may be understood that operation 501 is an optional operation.

The transmission configuration information may be known to both the network device and the terminal device, and may be predefined in a protocol. The transmission configuration information may be a separate set predefined in the protocol, or may be a subset of a set predefined in the protocol. The transmission configuration information may include a plurality of configuration indexes and transmission parameters corresponding to the configuration indexes. The transmission configuration information may be represented in a form of a table, or certainly may be represented in another form. The terms such as the transmission configuration information, the configuration index, and the transmission parameters are used as examples, and do not constitute a limitation on an embodiment of the application.

Table 1 is a table of transmission configuration information according to an embodiment of this application.

TABLE 1

| Configuration index | Transmission bandwidth (Quantity of subcarriers) | Extended bandwidth (Quantity of subcarriers) | Total bandwidth (Quantity of subcarriers) | Symbol rate | Oversampling multiple |
|---|---|---|---|---|---|
| 0 | 6144 | 1536 | 7680 | 92.16 MHz | 8/3 |
| 1 | 6144 | 684 | 6828 | 92.16 MHz | 8/3 |
| 2 | 6144 | 672 | 6816 | 92.16 MHz | 8/3 |
| 3 | 5120 | 1288 | 6408 | 76.8 MHz | 8/5 |
| 4 | 5120 | 1276 | 6396 | 76.8 MHz | 8/5 |
| 5 | 5120 | 580 | 5700 | 76.8 MHz | 8/5 |
| 6 | 5120 | 568 | 5688 | 76.8 MHz | 8/5 |
| 7 | 4096 | 1028 | 5124 | 61.44 MHz | 2/1 |
| 8 | 4096 | 1016 | 5122 | 61.44 MHz | 2/1 |
| 9 | 4096 | 464 | 4560 | 61.44 MHz | 2/1 |
| 10 | 4096 | 452 | 4548 | 61.44 MHz | 2/1 |
| 11 | 3072 | 768 | 3840 | 46.08 MHz | 4/3 |
| 12 | 3072 | 348 | 3420 | 46.08 MHz | 4/3 |
| 13 | 3072 | 336 | 3408 | 46.08 MHz | 4/3 |
| 14 | 2560 | 644 | 3204 | 38.4 MHz | 8/5 |
| 15 | 2560 | 632 | 3192 | 38.4 MHz | 8/5 |
| 16 | 2560 | 296 | 2856 | 38.4 MHz | 8/5 |
| 17 | 2560 | 284 | 2844 | 38.4 MHz | 8/5 |
| 18 | 2048 | 520 | 2568 | 30.72 MHz | 2/1 |
| 19 | 2048 | 508 | 2556 | 30.72 MHz | 2/1 |
| 20 | 2048 | 232 | 2280 | 30.72 MHz | 2/1 |
| 21 | 2048 | 220 | 2268 | 30.72 MHz | 2/1 |
| 22 | 1536 | 384 | 1920 | 23.04 MHz | 4/3 |
| 23 | 1536 | 180 | 1716 | 23.04 MHz | 4/3 |
| 24 | 1536 | 168 | 1704 | 23.04 MHz | 4/3 |
| 25 | 1280 | 328 | 1608 | 19.2 MHz | 5/3 |
| 26 | 1280 | 316 | 1596 | 19.2 MHz | 5/3 |
| 27 | 1280 | 148 | 1428 | 19.2 MHz | 5/3 |
| 28 | 1280 | 136 | 1416 | 19.2 MHz | 5/3 |
| 29 | 1024 | 260 | 1284 | 15.36 MHz | 2/1 |
| 30 | 1024 | 248 | 1272 | 15.36 MHz | 2/1 |
| 31 | 1024 | 104 | 1128 | 15.36 MHz | 2/1 |
| 32 | 1024 | 116 | 1140 | 15.36 MHz | 2/1 |
| 33 | 960 | 240 | 1200 | 14.4 MHz | 32/15 |
| 34 | 960 | 96 | 1056 | 14.4 MHz | 32/15 |
| 35 | 960 | 108 | 1068 | 14.4 MHz | 32/15 |
| 36 | 768 | 192 | 960 | 11.52 MHz | 8/3 |
| 37 | 768 | 84 | 852 | 11.52 MHz | 8/3 |
| 38 | 768 | 96 | 864 | 11.52 MHz | 8/3 |
| 39 | 512 | 136 | 648 | 7.68 MHz | 4/1 |
| 40 | 512 | 124 | 636 | 7.68 MHz | 4/1 |
| 41 | 512 | 52 | 564 | 7.68 MHz | 4/1 |
| 42 | 512 | 64 | 476 | 7.68 MHz | 4/1 |
| 43 | 384 | 96 | 480 | 5.76 MHz | 16/3 |
| 44 | 384 | 48 | 432 | 5.76 MHz | 16/3 |
| 45 | 384 | 36 | 420 | 5.76 MHz | 16/3 |
| 46 | 320 | 88 | 480 | 4.8 MHz | 32/5 |
| 47 | 320 | 76 | 396 | 4.8 MHz | 32/5 |
| 48 | 320 | 40 | 360 | 4.8 MHz | 32/5 |
| 49 | 320 | 28 | 348 | 4.8 MHz | 32/5 |
| 50 | 256 | 56 | 312 | 3.84 MHz | 8 |
| 51 | 256 | 68 | 324 | 3.84 MHz | 8 |
| 52 | 256 | 32 | 288 | 3.84 MHz | 8 |
| 53 | 256 | 20 | 276 | 3.84 MHz | 8 |
| 54 | 192 | 48 | 240 | 2.88 MHz | 32/3 |
| 55 | 192 | 24 | 216 | 2.88 MHz | 32/3 |
| 56 | 192 | 12 | 204 | 2.88 MHz | 32/3 |
| 57 | 160 | 32 | 192 | 2.4 MHz | 64/5 |
| 58 | 160 | 44 | 204 | 2.4 MHz | 64/5 |
| 59 | 160 | 8 | 168 | 2.4 MHz | 64/5 |
| 60 | 160 | 20 | 180 | 2.4 MHz | 64/5 |
| 61 | 128 | 28 | 156 | 1.92 MHz | 16 |
| 62 | 128 | 40 | 168 | 1.92 MHz | 16 |
| 63 | 128 | 4 | 132 | 1.92 MHz | 16 |
| 64 | 128 | 16 | 144 | 1.92 MHz | 16 |
| 65 | 96 | 24 | 120 | 1.44 MHz | 64/3 |
| 66 | 96 | 12 | 108 | 1.44 MHz | 64/3 |
| 67 | 80 | 16 | 96 | 1.2 MHz | 128/5 |
| 68 | 80 | 4 | 85 | 1.2 MHz | 128/5 |

TABLE 1-continued

| Configuration index | Transmission bandwidth (Quantity of subcarriers) | Extended bandwidth (Quantity of subcarriers) | Total bandwidth (Quantity of subcarriers) | Symbol rate | Oversampling multiple |
|---|---|---|---|---|---|
| 69 | 64 | 20 | 84 | 0.96 MHz | 32 |
| 70 | 64 | 8 | 72 | 0.96 MHz | 32 |
| 71 | 48 | 12 | 60 | 0.72 MHz | 128/3 |
| 72 | 40 | 8 | 48 | 0.6 MHz | 256/5 |
| 73 | 32 | 16 | 48 | 0.48 MHz | 64 |
| 74 | 32 | 4 | 36 | 0.48 MHz | 64 |

Each bandwidth in Table 1 is represented by using a quantity of subcarriers corresponding to the bandwidth. For example, the transmission bandwidth is represented by using the quantity of subcarriers corresponding to the transmission bandwidth. In frequency domain, one resource block (RB) may include 12 subcarriers. When a unit of the bandwidth is an RB, a relationship between the bandwidth and the quantity of subcarriers is: the bandwidth*12=the quantity of subcarriers. For example, when the quantity of subcarriers is 1536, a corresponding bandwidth is 1536/12=128 RBs. Each bandwidth in Table 1 may alternatively be represented by a quantity of RBs, or may be represented by a quantity of resource block groups (RBG), a quantity of physical resource blocks (PRB), or the like.

In Table 1, the transmission bandwidth represents a bandwidth used to transmit a signal, and the extended bandwidth is a bandwidth used for spectrum shaping. The spectrum shaping may be equivalent to a frequency domain shape of a time domain filter in a single-carrier waveform processing procedure. For any row in Table 1, the total bandwidth=the transmission bandwidth+the extended bandwidth, the symbol rate=the quantity of subcarriers corresponding to the transmission bandwidth*a subcarrier spacing (SCS), and the symbol rate indicates a signal transmission rate. A plurality of types of subcarrier spacings may be supported in the NR system, and a type of subcarrier spacing to be used may be known to both the network device and the terminal device. Therefore, for any row in Table 1, when the transmission bandwidth is known, the symbol rate can be determined; when the symbol rate is known, the transmission bandwidth can be determined. For example, in Table 1, the subcarrier spacing is 15 kHz. The terms in Table 1 are used as examples, and do not constitute a limitation on an embodiment of the application. For example, the transmission bandwidth may be described as a frequency domain resource allocation information field, an RBG, a PRB, or the like.

The configuration indexes in Table 1 are numbered starting from "0" and in descending order of quantities of subcarriers corresponding to the transmission bandwidth. This is used as an example and does not constitute a limitation on an embodiment of the application. For example, the configuration indexes may be numbered starting from "1". Table 1 shows transmission parameters respectively corresponding to 75 configuration indexes. The transmission parameters may include at least two of the transmission bandwidth, the extended bandwidth, the total bandwidth, or the symbol rate. The transmission configuration information may be Table 1 or a subset of Table 1. A case in which the transmission configuration information includes several columns of transmission parameters is described in subsequent Embodiment 1 to Embodiment 5.

The transmission configuration information enumerated in Table 1 may enable a symbol periodicity of a single-carrier symbol to be aligned with a symbol periodicity of a multi-carrier symbol, to implement multiplexing of the single-carrier waveform and the multi-carrier waveform.

Operation 502: The network device sends first indication information to the terminal device. Correspondingly, the terminal device receives the first indication information from the network device.

The network device may send the first indication information to the terminal device by using DCI, RRC information, or MAC CE information. The second indication information and the first indication information may be sent separately and carried in different information. Alternatively, the second indication information and the first indication information may be carried in a same piece of information. For example, the first indication information and the second indication information are carried in same DCI. When receiving the DCI, the terminal device may first determine, based on the second indication information, that the transmission configuration information can be used, and then determine transmission parameters corresponding to the first indication information based on the first indication information.

The transmission configuration information may be understood as a table including configuration indexes and transmission parameters corresponding to the configuration indexes, and the first indication information may be used to indicate the configuration index, to be specific, indicate one configuration index or several configuration indexes. For example, the transmission configuration information is Table 1, and the first indication information may indicate a configuration index "2" in Table 1. The first indication information may also be described as a configuration index, a transmission parameter index, or the like. For another example, the first indication information may indicate configuration indexes "2" and "3" in Table 1, and the terminal device may choose to use transmission parameters corresponding to the configuration index "2" or "3".

In an embodiment, when the network device broadcasts the second indication information, before sending the first indication information, the network device may receive capability information from the terminal device. The capability information is used to indicate that the terminal device supports transmission configuration information-based transmission, that is, indicate that the terminal device supports the transmission status. In this case, when the terminal device supports the transmission status, the network device may send the first indication information to the terminal device. Alternatively, the capability information is used to request for transmission configuration information-based transmission, that is, request for transmission in the transmission status.

Operation 503: The terminal device determines the transmission parameters corresponding to the first indication information.

When receiving the first indication information, the terminal device may determine, from the transmission configuration information, the transmission parameters corresponding to the first indication information, to be specific, search the transmission configuration information for transmission parameters corresponding to a configuration index indicated by the first indication information, that is, determine a transmission bandwidth and an extended bandwidth that correspond to the configuration index.

Operation 504: The terminal device processes an uplink symbol based on the transmission parameters corresponding to the first indication information to obtain an uplink signal.

In an embodiment, the terminal device may use a single-carrier waveform processing procedure, to process the uplink symbol based on the transmission parameters corresponding to the first indication information to obtain the uplink signal. It may be understood that, in this manner, a waveform of the uplink signal is a single-carrier waveform. This manner will be described in Embodiment 1.

In an embodiment, the terminal device may use a multi-carrier waveform processing procedure, to process the uplink symbol based on the transmission parameters corresponding to the first indication information to obtain the uplink signal. It may be understood that, in this manner, a waveform of the uplink signal is a multi-carrier waveform. This manner will be described in Embodiment 1.

Operation 505: The terminal device sends the uplink signal to the network device. Correspondingly, the network device receives the uplink signal from the terminal device.

Operation 506: The network device processes the uplink signal based on the transmission parameters corresponding to the first indication information to obtain the uplink symbol.

In an embodiment, if the waveform of the uplink signal sent by the terminal device is the single-carrier waveform, the network device may use the multi-carrier waveform processing procedure to process the uplink signal based on the transmission parameters corresponding to the first indication information to obtain the uplink symbol. In an embodiment, the network device may use the single-carrier waveform processing procedure to process the uplink signal based on the transmission parameters corresponding to the first indication information to obtain the uplink symbol.

In an embodiment, if the waveform of the uplink signal sent by the terminal device is the multi-carrier waveform, the network device may use the single-carrier waveform processing procedure to process the uplink signal based on the transmission parameters corresponding to the first indication information to obtain the uplink symbol. In an embodiment, the network device may use the multi-carrier waveform processing procedure to process the uplink signal based on the transmission parameters corresponding to the first indication information to obtain the uplink symbol.

In the embodiment shown in FIG. 5, in the scenario in which the single-carrier waveform and the multi-carrier waveform coexist, by using the transmission parameters corresponding to the configuration indexes included in the transmission configuration information, both the single-carrier waveform and the multi-carrier waveform can be processed. The single-carrier waveform and the multi-carrier waveform may both use the transmission configuration information, compared with using two sets of parameters, the device can implement signal sending and receiving with low complexity, and avoid device overheads resulting from installing two sets of transceivers.

The embodiment shown in FIG. 5 uses uplink transmission as an example. The embodiments of this application may also be applied to downlink transmission. In a downlink transmission process, the network device processes a downlink signal by using the transmission configuration information to obtain a downlink symbol. The first indication information is used to indicate a configuration index corresponding to transmission parameters used by the network device. When receiving the first indication information and the downlink signal, the terminal device may process the downlink signal based on the transmission parameters corresponding to the first indication information to obtain the downlink symbol. When a waveform of the downlink signal is the single-carrier waveform, the terminal device may process the downlink signal by using the multi-carrier waveform processing procedure; when a waveform of the downlink signal is the multi-carrier waveform, the terminal device may process the downlink signal by using the single-carrier waveform processing procedure.

Figure 6:
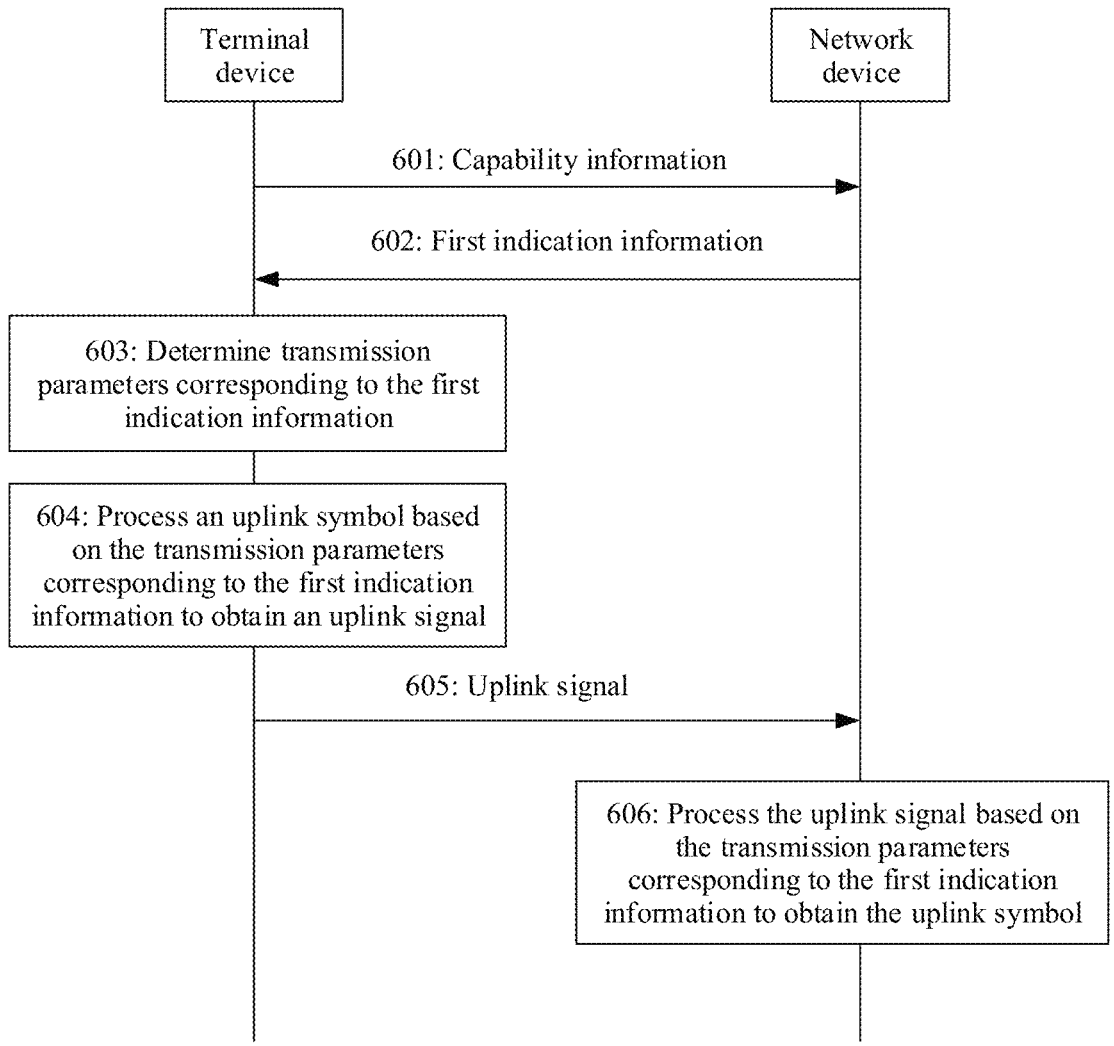
FIG. 6 is a schematic flowchart of a signal transmission method according to an embodiment of this application.

FIG. 6 is a schematic flowchart of another signal transmission method according to an embodiment of this application. The method may include but is not limited to the following operations.

Operation 601: A terminal device sends capability information to a network device. Correspondingly, the network device receives the capability information from the terminal device.

The capability information is used to indicate that the terminal device supports transmission configuration information-based transmission, that is, indicate that the terminal device supports the transmission status described in operation 501. Alternatively, the capability information is used to request for transmission configuration information-based transmission, that is, request for transmission in the transmission status described in operation 501. In this case, the capability information may be understood as a request message, and the request message is used to request for the transmission in the transmission status.

The capability information may be carried in RRC information or RACH sequence information, and the RACH sequence information is, for example, a random access preamble sequence.

Operation 602: The network device sends first indication information to the terminal device. Correspondingly, the terminal device receives the first indication information from the network device.

When receiving the capability information, the network device sends the first indication information to the terminal device. The network device sends first indication information to the terminal device. For example, refer to descriptions in operation 502.

Operation 603: The terminal device determines transmission parameters corresponding to the first indication information.

Operation 604: The terminal device processes an uplink symbol based on the transmission parameters corresponding to the first indication information to obtain an uplink signal.

Operation 605: The terminal device sends the uplink signal to the network device. Correspondingly, the network device receives the uplink signal from the terminal device.

Operation 606: The network device processes the uplink signal based on the transmission parameters corresponding to the first indication information to obtain the uplink symbol.

For an implementation process of operation 603 to operation 606, refer to descriptions of operation 503 to operation 506 in the embodiment shown in FIG. 5. Details are not described herein again.

A difference between the embodiment shown in FIG. 6 and the embodiment shown in FIG. 5 lies in that, in FIG. 5, the network device delivers the second indication information and the first indication information, and in FIG. 6, the terminal device sends the capability information to trigger the network device to deliver the first indication information.

In an embodiment, the capability information sent by the terminal device to the network device is used to indicate that the terminal device is a UE of a single-carrier type. For example, UE_type=SC indicates that the UE is a UE of the single-carrier type, that is, the UE supports a single-carrier waveform processing procedure. Alternatively, the capability information is used to request to use the single-carrier waveform processing procedure. For example, UE_SC_CONFIG=1 indicates that the UE requests to use the single-carrier waveform processing procedure. When a capability of the terminal device is limited, for example, a power level is low, the terminal device may request, from the network device, to use the single-carrier waveform processing procedure.

In an embodiment, the capability information sent by the terminal device to the network device is used to indicate that the terminal device is a UE with a big bandwidth (BBW) requirement. For example, UE_type=BBW indicates that the UE is a UE that expects to transmit a large bandwidth, that is, the UE expects to use a transmission method with low complexity, that is, supports the single-carrier waveform processing procedure. Alternatively, the capability information is used to request to use a large bandwidth transmission method with low complexity. For example, UE_BBW_CONFIG=1 indicates that the UE requests to use the large bandwidth transmission method with low complexity, namely, the single-carrier waveform processing procedure. When the terminal device has a large bandwidth requirement, for example, in some corresponding large transmission bandwidth scenarios in Table 1, for example, scenarios of bandwidth requirements such as 6144 and 5120 subcarriers, the terminal device may request, from the network device, to use the single-carrier waveform processing procedure.

In the foregoing two implementations, for uplink transmission, the terminal device uses the single-carrier waveform processing procedure to process the uplink symbol based on the transmission parameters corresponding to the first indication information to obtain the uplink signal; the network device may use the multi-carrier waveform processing procedure to process the uplink signal based on the transmission configuration information to obtain the uplink symbol. For downlink transmission, the terminal device uses the single-carrier waveform processing procedure to process the downlink signal based on the transmission parameters corresponding to the first indication information to obtain the downlink symbol.

The following uses uplink transmission as an example. With reference to the single-carrier waveform processing procedure and the multi-carrier waveform processing procedure, a processing procedure of an uplink symbol is described by using Embodiment 1 to Embodiment 5. In an introduction process, the multi-carrier waveform processing procedure is a processing procedure of a DFT-s-OFDM technology for example, and the single-carrier waveform processing procedure is a processing procedure of an SC-QAM technology for example.

Embodiment 1: The transmission configuration information includes configuration indexes, and transmission bandwidths and extended bandwidths that correspond to the configuration indexes.

The transmission configuration information in Embodiment 1 may be represented by using Table 2 below. Table 2 may include 75 configuration indexes. For omitted configuration indexes and corresponding transmission bandwidths and extended bandwidths, refer to Table 1. Table 2 may alternatively include some of the 75 configuration indexes, and transmission bandwidths and extended bandwidths that correspond to the configuration indexes.

TABLE 2

| Configuration index | Transmission bandwidth (Quantity of subcarriers) | Extended bandwidth (Quantity of subcarriers) |
| --- | --- | --- |
| 0 | 6144 | 1536 |
| 1 | 6144 | 684 |
| 2 | 6144 | 672 |
| 3 | 5120 | 1288 |
| 4 | 5120 | 1276 |
| . . . | . . . | . . . |
| 73 | 32 | 16 |
| 74 | 32 | 4 |

When receiving the first indication information, the terminal device searches Table 2 for a transmission bandwidth and an extended bandwidth that correspond to the first indication information, that is, searches for a transmission bandwidth and an extended bandwidth that correspond to an indicated configuration index. It may be understood that a transmission bandwidth and an extended bandwidth that correspond to each configuration index in Table 2 represent an association relationship between the transmission bandwidth and the extended bandwidth that correspond to each configuration index. For example, a quantity of subcarriers corresponding to a transmission bandwidth corresponding to a configuration index "2" is 6144 (that is, the transmission bandwidth is 6144 subcarriers), and a quantity of subcarriers corresponding to an extended bandwidth corresponding to the configuration index "2" is 672 (that is, the extended bandwidth is 672 subcarriers). This indicates that an association relationship between the transmission bandwidth and the extended bandwidth that correspond to the configuration index "2" is that the transmission bandwidth is 6144 subcarriers, and the extended bandwidth is 672 subcarriers. The quantity of subcarriers corresponding to each transmission bandwidth in Table 2 may be an integer multiple of 12, or may not be an integer multiple of 12. Therefore, this application has a wide application scope and is flexible. The association relationships enumerated in Table 2 may enable a symbol periodicity of a single-carrier symbol to be aligned with a symbol periodicity of a multi-carrier symbol, to implement multiplexing of the single-carrier waveform and the multi-carrier waveform.

Table 2 includes two columns of transmission parameters in total: transmission bandwidths and extended bandwidths that correspond to the configuration indexes. In an embodiment, Table 2 may further include a column of transmission parameters, namely, symbol rates. In this case, Table 2 includes three columns of transmission parameters in total: the transmission bandwidth, the extended bandwidth, and the symbol rate that correspond to the configuration index. That is, the transmission configuration information further includes an association relationship between the transmission bandwidth and the symbol rate. For the association relationship between the transmission bandwidth and the symbol rate that correspond to each configuration index, refer to Table 1. In an embodiment, Table 2 may further include a column of transmission parameters, namely, total bandwidths. In this case, Table 2 includes three columns of transmission parameters in total: the transmission bandwidth, the extended bandwidth, and the total bandwidth that correspond to the configuration index. That is, the transmission configuration information further includes an association relationship between the transmission bandwidth or the extended bandwidth and the total bandwidth. Alternatively, Table 2 includes four columns of transmission parameters in total: the transmission bandwidth, the extended bandwidth, the total bandwidth, and the symbol rate that correspond to the configuration index. For the association relationship between each configuration index and the total bandwidth, refer to Table 1.

When receiving the first indication information, the terminal device may determine, by searching Table 2, the transmission bandwidth and the extended bandwidth that correspond to the first indication information. When Table 2 includes two columns of transmission parameters in total, namely, the transmission bandwidth and the extended bandwidth that correspond to the configuration index, the total bandwidth and the symbol rate that correspond to the first indication information may be calculated.

When determining the transmission bandwidth and the extended bandwidth that correspond to the first indication information, the terminal device may determine a filter parameter corresponding to the transmission. The filter parameter may be a roll-off factor β, and the roll-off factor may alternatively be described as an expansion factor, a shaping factor, or the like. The roll-off factor β=the extended bandwidth/(the transmission bandwidth+the extended bandwidth)=the extended bandwidth/the total bandwidth.

When the roll-off factor is calculated, a filter coefficient may be generated according to a predefined filter shaping formula, to determine a filter shape. For example, the filter is a root raised cosine (RRC) filter, and a filter shaping formula of the filter is:

$$h(t) = \begin{cases} \frac{1}{T_S}*\left(1+\beta*\left(\frac{4}{\pi}-1\right)\right), t=0 \\ \frac{\beta}{T_S*\sqrt{2}}*\left[\left(1+\frac{2}{\pi}\right)*\sin\left(\frac{\pi}{4\beta}\right)+\left(1-\frac{2}{\pi}\right)*\cos\left(\frac{\pi}{4\beta}\right)\right], t=\pm\frac{T_S}{4\beta} \\ \frac{1}{T_S}*\frac{\sin\left[\pi*\frac{t}{T_S}*(1-\beta)\right]+4\beta*\frac{t}{T_S}*\cos\left[\pi*\frac{t}{T_S}*(1+\beta)\right]}{\pi*\frac{t}{T_S}*\left[1-\left(4\beta*\frac{t}{T_S}\right)^2\right]}, \text{others} \end{cases}$$

$T_S$ represents a symbol rate, namely, Fd below, and the symbol rate may be calculated based on a product of a quantity of subcarriers corresponding to the transmission bandwidth and a subcarrier spacing. In an embodiment of the application, the filter is not limited to the RRC filter, and may alternatively be another type of filter. For example, the filter may alternatively be a square root raised cosine filter or a Kaiser window filter. The type of the filter may be known to both the network device and the terminal device. Regardless of which type of filter is used, the filter coefficient needs to be generated based on the roll-off factor, to determine the filter shape.

For example, when a configuration index indicated by the first indication information is "2", it may be obtained through searching Table 2 that, the quantity of subcarriers corresponding to the transmission bandwidth is 6144, and the quantity of subcarriers corresponding to the extended bandwidth is 672. Further, the corresponding roll-off factor β=972/(6144+672)≈0.1 can be calculated. Assuming that the subcarrier spacing is 15 kHz, $T_S$=6144*15 kHz=92.16 MHz can be obtained. The filter shape may be determined by substituting β and $T_S$ into the foregoing formula.

Figure 7:
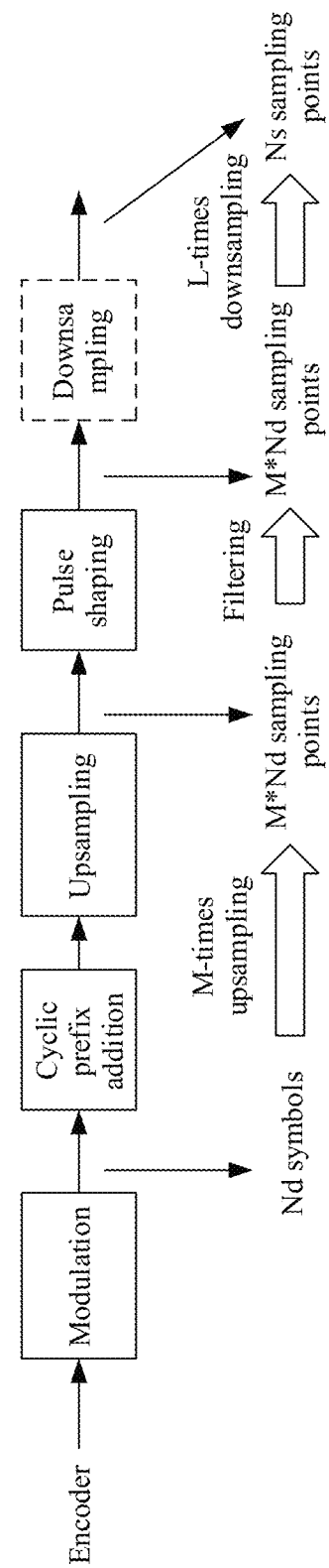
FIG. 7 is a schematic diagram of a processing procedure of an SC-QAM technology according to an embodiment of this application.

It is assumed that the terminal device processes an uplink symbol by using a single-carrier waveform processing procedure. FIG. 7 is a schematic diagram of a processing procedure of an SC-QAM technology according to an embodiment of this application. FIG. 7 shows a sending process, and does not show a receiving process. The receiving process may be understood as an inverse process of the sending process. The uplink symbol may be obtained through modulation processing, or may be obtained through modulation and cyclic prefix addition processing.

A quantity of uplink symbols is Nd, and Nd may be a quantity of subcarriers corresponding to the transmission bandwidth corresponding to the first indication information. M-times upsampling processing is performed on Nd uplink symbols to obtain M*Nd sampling points; then, pulse shaping processing is performed to obtain M*Nd sampling points; and further, L-times downsampling processing is performed to obtain Ns sampling points. Ns=Nd*M/L, where M and L are integers, and M is greater than L (to satisfy the Nyquist sampling theorem). To avoid high complexity, values of M and L should not be excessively large. If the values are excessively large, storage and operation complexity are greatly affected. When the network device processes a received uplink signal by using a processing procedure of a DFT-s-OFDM technology, a value of M is 2, 4, 8, 16, or the like, that is, $2^m$, where m is a positive integer. L may be greater than or equal to 1. If L=1, the procedure shown in FIG. 7 does not include downsampling. If L is greater than 1, the procedure shown in FIG. 7 includes downsampling.

Table 1 or Table 2 may further include a column of parameters, namely, oversampling multiples, and the oversampling multiple may be used to represent a ratio of an upsampling multiple to a downsampling multiple in the procedure shown in FIG. 7. The oversampling multiple and the symbol rate may be displayed in a same column, for example, "the symbol rate (the oversampling multiple)" or "the symbol rate (1/the oversampling multiple)".

The oversampling multiple=M/L=a sampling frequency/the symbol rate. The sampling frequency may be represented by Fs, and the symbol rate may be represented by Fd, where Fs=Fd*M/L. The sampling frequency Fs may be known to both the network device and the terminal device. For example, when the subcarrier spacing is 15 kHz, the sampling frequency is 30.72 MHz=15 kHz*an FFT size. The FFT size is Ns, Ns=Nd*M/L, Fs=the subcarrier spacing*Ns, and Ns is a size of FFT or DFT in a multi-carrier waveform processing procedure, that is, an Ns-point FFT or DFT is performed. It may be understood that Ns is a known value.

For example, a symbol rate corresponding to a configuration index "22" may be represented by 23.04 MHz, and an oversampling multiple may be represented by 4/3, or the two may be represented together by 23.04 MHz (4/3). When the oversampling multiple is represented by 4/3 and the sampling frequency is 30.72 MHz, Fd=Fs*L/M=30.72*3/4=23.04 MHz may be calculated according to Fs=Fd*M/L. In Table 1, the configuration index "22" and the oversampling multiple corresponding to the configuration index "22" are based on the sampling frequency of 30.72 MHz.

Assuming that a transmission bandwidth corresponding to the configuration index "22" is 1536 subcarriers, and an extended bandwidth corresponding to the configuration index "22" is 384 subcarriers, a roll-off factor β=384/(1536+384)=0.2 is calculated. Assuming that the subcarrier spacing is 15 kHz, the symbol rate $T_S$=1536*15 kHz=23.04 MHz can be obtained. The filter shape may be determined by substituting β and $T_S$ into the foregoing formula. When learning of the configuration index, the terminal device may calculate, based on a ratio of the sampling frequency (known) to the symbol rate, that the oversampling multiple is 4/3, and further may determine that the upsampling multiple is 4 and the downsampling multiple is 3. Then, the terminal device processes the uplink symbol based on the upsampling multiple, the filter shape, and the downsampling multiple, to obtain the uplink signal.

Figure 8:
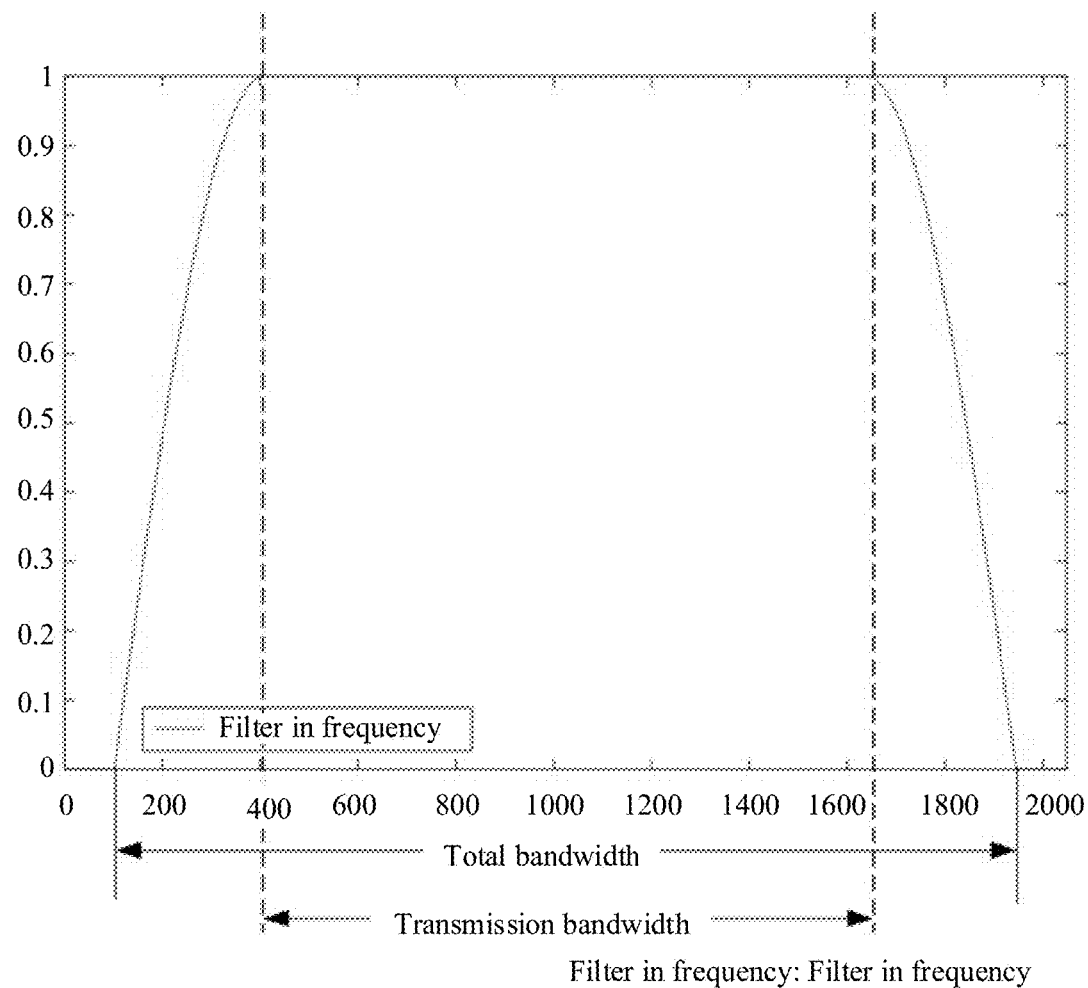
FIG. 8 is a schematic diagram of a filter shape according to an embodiment of this application.

An effect of pulse shaping in FIG. 7 in frequency domain may be understood as spectrum shaping. Therefore, pulse shaping may be understood as filtering. During filtering, the roll-off factor is calculated based on the quantity of subcarriers corresponding to the transmission bandwidth corresponding to the first indication information and the quantity of subcarriers corresponding to the extended bandwidth corresponding to the first indication information, to further determine the filter shape. FIG. 8 is a schematic diagram of a filter shape according to an embodiment of this application. FIG. 8 shows a transmission bandwidth and a total bandwidth. The extended bandwidth is obtained by subtracting the transmission bandwidth from the total bandwidth, and the extended bandwidth does not increase an amount of transmitted information. The terminal device processes an uplink symbol according to the procedure shown in FIG. 7. For an effect of an obtained uplink signal in frequency domain, refer to FIG. 8.

A signal obtained through a single-carrier waveform sending processing procedure may be described as a signal sent by using the single-carrier waveform, a signal obtained through a low-complexity processing procedure, a signal sent without frequency domain processing, or the like.

Figure 9:
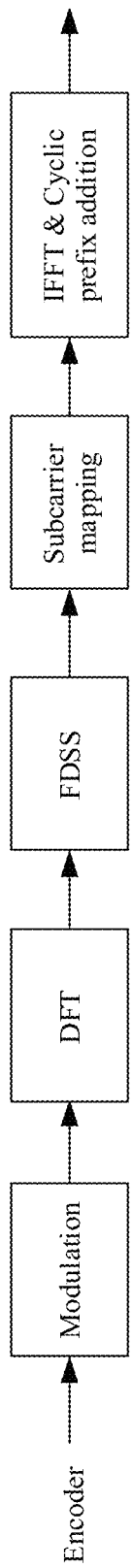
FIG. 9 is a schematic diagram of a processing procedure of a DFT-s-OFDM technology according to an embodiment of this application.

It is assumed that the terminal device processes an uplink symbol by using a multi-carrier waveform processing procedure. FIG. 9 is a schematic diagram of a processing procedure of a DFT-s-OFDM technology according to an embodiment of this application. FIG. 9 shows a sending process, and does not show a receiving process. The receiving process may be understood as an inverse process of the sending process. In FIG. 9, processing such as modulation, DFT, frequency domain spectral shaping (FDSS), subcarrier mapping, IFFT, and cyclic prefix addition is sequentially performed on an uplink symbol input by an encoder to obtain an uplink signal.

Figure 10:
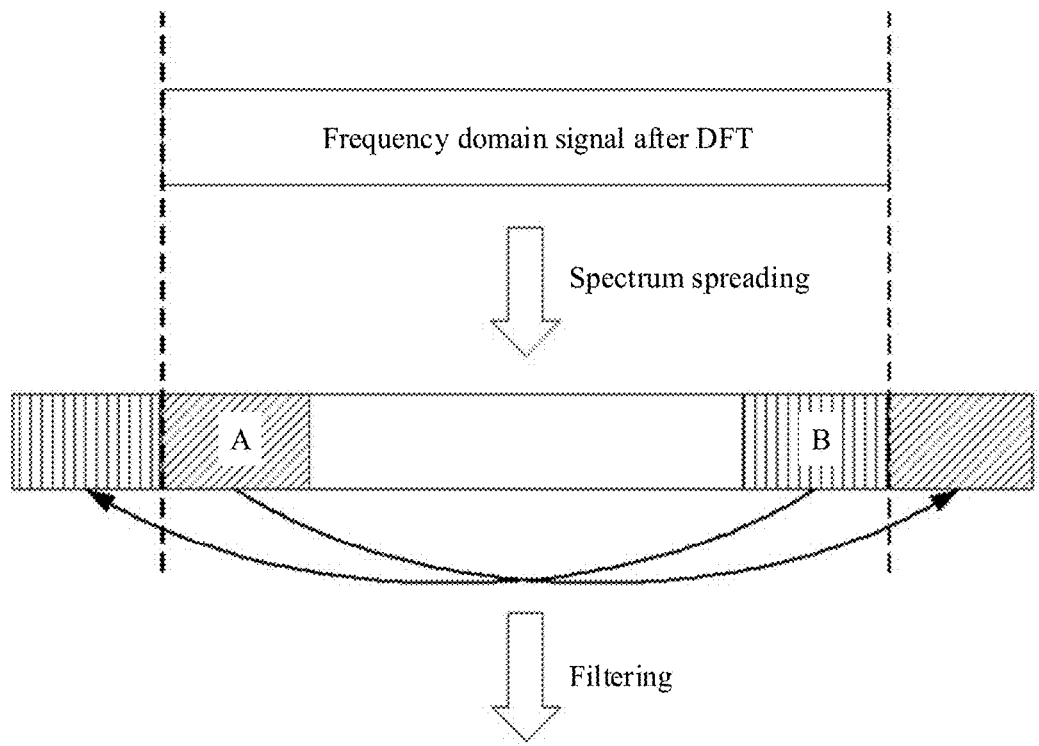
FIG. 10 is a schematic diagram of FDSS according to an embodiment of this application.

The FDSS may implement spectrum spreading. A dot product of a frequency domain signal after DFT and a spectrum shaping sequence is calculated, to obtain a frequency domain signal after spectrum spreading. FIG. 10 is a schematic diagram of FDSS according to an embodiment of this application. In FIG. 10, the spectrum shaping sequence is a part A and a part B of a frequency domain signal after DFT, and a dot product of the part A and the part B of the frequency domain signal after DFT and a group of coefficients is calculated, to obtain a frequency domain signal after spectrum spreading. A bandwidth corresponding to the frequency domain signal obtained through spectrum spreading is larger than a bandwidth corresponding to the frequency domain signal after DFT. In addition to spectrum spreading, the FDSS may further implement filtering, and may filter the frequency domain signal after spectrum spreading. For an effect after filtering, refer to FIG. 8.

Assuming that a transmission bandwidth corresponding to the configuration index "22" is 1536 subcarriers, and an extended bandwidth corresponding to the configuration index "22" is 384 subcarriers, a roll-off factor β=384/(1536+384)=0.2 is calculated. Assuming that the subcarrier spacing is 15 kHz, the symbol rate $T_S$=1536*15 kHz=23.04 MHz can be obtained. The filter shape may be determined by substituting β and $T_S$ into the foregoing formula. When learning of the configuration index, the terminal device performs DFT based on 1536 symbols, so that a bandwidth of a frequency domain signal after DFT is 1536 subcarriers. Then, the terminal device performs spectrum spreading based on the extended bandwidth, and performs filtering based on the filter shape.

That the terminal device performs filtering, based on the transmission bandwidth and the extended bandwidth that correspond to the first indication information, on the frequency domain signal after spectrum spreading may include: calculating the roll-off factor based on the transmission bandwidth and the extended bandwidth, further determining the filter shape, and performing filtering by using the filter shape.

A signal obtained through a multi-carrier waveform sending processing procedure may be described as a signal sent by using the DFT-s-OFDM waveform, a signal sent after frequency domain processing, or the like.

The terminal device processes an uplink symbol by using the procedure shown in FIG. 7 to obtain an uplink signal, and sends the uplink signal to the network device. For example, the terminal device performs cyclic prefix addition, upsampling, pulse shaping, and downsampling processing on a modulated uplink symbol based on the transmission bandwidth and the extended bandwidth that correspond to the first indication information to obtain an uplink signal, and finally sends the uplink signal by using a radio frequency component and an antenna port. In FIG. 7, when the downsampling multiple is not 1, a downsampling process is performed. However, the sending process shown in FIG. 2 or FIG. 3 does not include the downsampling process. When learning of the transmission bandwidth and the extended bandwidth that correspond to the first indication information, the network device may determine the roll-off factor, and process the received uplink signal based on the roll-off factor according to the receiving procedure corresponding to FIG. 9, to obtain the uplink symbol. For example, the receiving procedure corresponding to FIG. 9 may include processes such as cyclic prefix removal, FFT, subcarrier mapping removal, IDFT, and demodulation.

The terminal device processes an uplink symbol by using the procedure shown in FIG. 9 to obtain an uplink signal, and sends the uplink signal to the network device. For example, the terminal device performs processing such as DFT, FDSS, subcarrier mapping, IFFT, and cyclic prefix addition on a modulated uplink symbol based on the transmission bandwidth and the extended bandwidth that correspond to the first indication information to obtain an uplink signal, and finally sends the uplink signal by using a radio frequency component and an antenna port. In a transmit end procedure shown in FIG. 9, FDSS is added on the basis of a transmit end procedure shown in FIG. 1, so that a PAPR can be reduced. When learning of the transmission bandwidth and the extended bandwidth that correspond to the first indication information, the network device may determine the roll-off factor, and process the received uplink signal based on the roll-off factor according to the receiving procedure corresponding to FIG. 7, to obtain the uplink symbol. For example, the receiving procedure corresponding to FIG. 7 may include processes such as matched filtering, cyclic prefix removal, and demodulation.

In an embodiment, the association relationship between the transmission bandwidth and the extended bandwidth is that a sum of a quantity of subcarriers corresponding to the transmission bandwidth and a quantity of subcarriers corresponding to the extended bandwidth is an integer multiple of 12, and the quantity of subcarriers corresponding to the transmission bandwidth is $a*2^n$, where a is a positive integer, and n is a positive integer. $a*2^n$ may or may not be an integer multiple of 12. It may be understood that, this application is also applicable to a case in which the quantity of subcarriers corresponding to the transmission bandwidth is not an integer multiple of 12, provided that a quantity of subcarriers corresponding to the total bandwidth is an integer multiple of 12. Compared with Table 2, this manner is more flexible and has a wider application scope.

Embodiment 2: The transmission configuration information includes configuration indexes, and transmission bandwidths and total bandwidths that correspond to the configuration indexes.

The transmission configuration information in Embodiment 2 may be represented by using Table 3 below. Table 3 may include 75 configuration indexes. For omitted configuration indexes and corresponding transmission bandwidths and total bandwidths, refer to Table 1. Table 3 may alternatively include some of the 75 configuration indexes, and transmission bandwidths and total bandwidths that correspond to the some configuration indexes.

TABLE 3

| Configuration index | Transmission bandwidth (Quantity of subcarriers) | Total bandwidth (Quantity of subcarriers) |
| --- | --- | --- |
| 0 | 6144 | 7680 |
| 1 | 6144 | 6828 |
| 2 | 6144 | 6816 |
| 3 | 5120 | 6408 |
| 4 | 5120 | 6396 |
| ... | ... | ... |
| 70 | 32 | 48 |
| 71 | 32 | 36 |

When receiving the first indication information, the terminal device searches Table 3 for a transmission bandwidth and a total bandwidth that correspond to the first indication information, that is, searches for a transmission bandwidth and a total bandwidth that correspond to an indicated configuration index. It may be understood that a transmission bandwidth and a total bandwidth that correspond to each configuration index in Table 3 represent an association relationship between the transmission bandwidth and the total bandwidth that correspond to each configuration index. For example, a quantity of subcarriers corresponding to a transmission bandwidth corresponding to a configuration index "2" is 6144 (that is, the transmission bandwidth is 6144 subcarriers), and a quantity of subcarriers corresponding to a total bandwidth corresponding to the configuration index "2" is 6816 (that is, the total bandwidth is 6816 subcarriers). This indicates that an association relationship between the transmission bandwidth and the total bandwidth that correspond to the configuration index "2" is that the transmission bandwidth is 6144 subcarriers, and the total bandwidth is 6816 subcarriers. The quantity of subcarriers corresponding to each total bandwidth in Table 3 is an integer multiple of 12.

In an embodiment, Table 3 may further include a column of transmission parameters, namely, symbol rates. That is, the transmission configuration information further includes an association relationship between the transmission bandwidth and the symbol rate. In an embodiment, Table 3 may further include a column of transmission parameters, namely, extended bandwidths. That is, the transmission configuration information further includes an association relationship between the transmission bandwidth and the extended bandwidth, or an association relationship between the total bandwidth and the extended bandwidth.

When the terminal device obtains, by searching Table 3, a transmission bandwidth and a total bandwidth that correspond to a configuration index, and obtains a quantity of subcarriers corresponding to an extended bandwidth based on a difference between a quantity of subcarriers corresponding to the total bandwidth and a quantity of subcarriers corresponding to the transmission bandwidth. Further, the terminal device may determine a roll-off factor, and further determine a filter waveform. For the roll-off factor, refer to the description of the roll-off factor in Embodiment 1.

Embodiment 3: The transmission configuration information includes configuration indexes, and extended bandwidths and total bandwidths that correspond to the configuration indexes.

The transmission configuration information in Embodiment 3 may be represented by using Table 4 below. Table 4 may include 75 configuration indexes. For omitted configuration indexes and corresponding extended bandwidths and total bandwidths, refer to Table 1. Table 4 may alternatively include some of the 75 configuration indexes, and extended bandwidths and total bandwidths that correspond to the some configuration indexes.

TABLE 4

| Configuration index | Extended bandwidth (Quantity of subcarriers) | Total bandwidth (Quantity of subcarriers) |
| --- | --- | --- |
| 0 | 1536 | 7680 |
| 1 | 684 | 6828 |
| 2 | 672 | 6816 |
| 3 | 1288 | 6408 |
| 4 | 1276 | 6396 |
| ... | ... | ... |
| 70 | 16 | 48 |
| 71 | 4 | 36 |

When receiving the first indication information, the terminal device searches Table 4 for an extended bandwidth and a total bandwidth that correspond to the first indication information, that is, searches for an extended bandwidth and a total bandwidth that correspond to an indicated configuration index. It may be understood that an extended bandwidth and a total bandwidth that correspond to each configuration index in Table 4 represent an association relationship between an extended bandwidth and a total bandwidth that correspond to each configuration index. For example, a quantity of subcarriers corresponding to an extended bandwidth corresponding to a configuration index "2" is 672 (that is, the extended bandwidth is 672 subcarriers), and a quantity of subcarriers corresponding to a total bandwidth corresponding to the configuration index "2" is 6816 (that is, the total bandwidth is 6816 subcarriers). This indicates that an association relationship between the extended bandwidth and the total bandwidth that correspond to the configuration index "2" is that the extended bandwidth is 672 subcarriers, and the total bandwidth is 6816 subcarriers. The quantity of subcarriers corresponding to each total bandwidth in Table 4 is an integer multiple of 12.

In an embodiment, Table 4 may further include a column of transmission parameters, namely, transmission bandwidths. That is, the transmission configuration information further includes an association relationship between the total bandwidth and the transmission bandwidth. In an embodiment, Table 4 may further include a column of transmission parameters, namely, symbol rates. That is, the transmission configuration information further includes an association relationship between the transmission bandwidth and the symbol rate.

When obtaining, by searching Table 4, an extended bandwidth and a total bandwidth that correspond to a configuration index, the terminal device may determine a roll-off factor, and further determine a filter waveform. For the roll-off factor, refer to the description of the roll-off factor in Embodiment 1. The terminal device may determine a transmission bandwidth corresponding to the configuration index based on a difference between the total bandwidth and the extended bandwidth, and may further determine a symbol rate corresponding to the configuration index based on the transmission bandwidth.

Embodiment 4: The transmission configuration information includes configuration indexes, and extended bandwidths and symbol rates that correspond to the configuration indexes.

The transmission configuration information in Embodiment 4 may be represented by using Table 5 below. Table 5 may include 75 configuration indexes. For omitted configuration indexes and corresponding extended bandwidths and symbol rates, refer to Table 1. Table 5 may alternatively include some of the 75 configuration indexes, and extended bandwidths and symbol rates that correspond to the some configuration indexes.

TABLE 5

| Configuration index | Extended bandwidth (Quantity of subcarriers) | Symbol rate |
| --- | --- | --- |
| 0 | 1536 | 92.16 MHz |
| 1 | 684 | 92.16 MHz |
| 2 | 672 | 92.16 MHz |
| 3 | 1288 | 76.8 MHz |
| 4 | 1276 | 76.8 MHz |
| ... | ... | ... |
| 70 | 16 | 0.48 MHz |
| 71 | 4 | 0.48 MHz |

When receiving the first indication information, the terminal device searches Table 5 for an extended bandwidth and a symbol rate that correspond to the first indication information, that is, searches for an extended bandwidth and a symbol rate that correspond to an indicated configuration index. It may be understood that an extended bandwidth and a symbol rate that correspond to each configuration index in Table 5 represent an association relationship between the extended bandwidth and the symbol rate that correspond to each configuration index. For example, a quantity of subcarriers corresponding to an extended bandwidth corresponding to a configuration index "2" is 672 (that is, the extended bandwidth is 672 subcarriers), and a symbol rate is 92.16 MHz. This indicates that an association relationship between the extended bandwidth and the symbol rate that correspond to the configuration index "2" is that the extended bandwidth is 672 subcarriers, and the symbol rate is 92.16 MHz.

In addition to being represented by a value, the symbol rate in Table 5 may also be represented by an oversampling multiple or 1/the oversampling multiple, or may be represented by a value+the oversampling multiple (or 1/the oversampling multiple). For example, a symbol rate corresponding to a configuration index "22" may be represented by 23.04 MHz, may be represented by 4/3 or 3/4, or may be represented by 23.04 MHz (4/3) or 23.04 MHz (3/4). When the oversampling multiple is represented by 4/3 or 3/4 and the sampling frequency is 30.72 MHz, Fd=Fs*L/M=30.72*3/4=23.04 MHz may be calculated according to Fs=Fd*M/L.

In an embodiment, Table 5 may further include a column of transmission parameters, namely, transmission bandwidths. That is, the transmission configuration information further includes an association relationship between the symbol rate and the transmission bandwidth. In an embodiment, Table 5 may further include a column of transmission parameters, namely, total bandwidths. That is, the transmission configuration information further includes an association relationship between the extended bandwidth and the total bandwidth.

When obtaining, by searching Table 5, an extended bandwidth and a symbol rate corresponding to a configuration index, the terminal device may determine, based on the symbol rate, a transmission bandwidth corresponding to the configuration index. Further, the terminal device may determine a total bandwidth and a roll-off factor that correspond to the configuration index, and further determine a filter waveform.

Embodiment 5: The transmission configuration information includes configuration indexes, and total bandwidths and symbol rates that correspond to the configuration indexes.

The transmission configuration information in Embodiment 5 may be represented by using Table 6 below. Table 6 may include 75 configuration indexes. For omitted configuration indexes and corresponding total bandwidths and symbol rates, refer to Table 1. Table 6 may alternatively include some of the 75 configuration indexes, and total bandwidths and symbol rates that correspond to the some configuration indexes.

TABLE 6

| Configuration index | Total bandwidth (Quantity of subcarriers) | Symbol rate |
| --- | --- | --- |
| 0 | 7680 | 92.16 MHz |
| 1 | 6828 | 92.16 MHz |
| 2 | 6816 | 92.16 MHz |
| 3 | 6408 | 76.8 MHz |
| 4 | 6396 | 76.8 MHz |
| ... | ... | ... |
| 70 | 48 | 0.48 MHz |
| 71 | 36 | 0.48 MHz |

When receiving the first indication information, the terminal device searches Table 6 for a total bandwidth and a symbol rate that correspond to the first indication information, that is, searches for a total bandwidth and a symbol rate that correspond to an indicated configuration index. It may be understood that a total bandwidth and a symbol rate that correspond to each configuration index in Table 6 represent an association relationship between a total bandwidth and a symbol rate that correspond to each configuration index. For example, a quantity of subcarriers corresponding to a total bandwidth corresponding to a configuration index "2" is 6816 (that is, the total bandwidth is 6816 subcarriers), and a symbol rate is 92.16 MHz. This indicates that an association relationship between the total bandwidth and the symbol rate that correspond to the configuration index "2" is that the total bandwidth is 6816 subcarriers, and the symbol rate is 92.16 MHz.

In addition to being represented by a value, the symbol rate in Table 6 may also be represented by an oversampling multiple or 1/the oversampling multiple, or may be represented by a value+the oversampling multiple (or 1/the oversampling multiple).

In an embodiment, Table 6 may further include a column of transmission parameters, namely, transmission bandwidths. That is, the transmission configuration information further includes an association relationship between the symbol rate and the transmission bandwidth. In an embodiment, Table 6 may further include a column of transmission parameters, namely, extended bandwidths. That is, the transmission configuration information further includes an association relationship between the total bandwidth and the extended bandwidth.

When obtaining, by searching Table 6, a total bandwidth and a symbol rate corresponding to a configuration index, the terminal device may determine, based on the symbol rate, a transmission bandwidth corresponding to the configuration index. Further, the terminal device may determine an extended bandwidth corresponding to the configuration index, determine a roll-off factor, and further determine a filter waveform.

It may be understood that, Table 1 includes four columns of transmission parameters corresponding to the configuration index, and Table 2 to Table 6 each include two columns of transmission parameters in the four columns of transmission parameters in Table 1. The transmission configuration information provided in an embodiment of the application includes the following association relationship for a configuration index:

a total bandwidth=a transmission bandwidth+an extended bandwidth, where a quantity of subcarriers corresponding to the total bandwidth is an integer multiple of 12; and a symbol rate=a quantity of subcarriers corresponding to the transmission bandwidth*a subcarrier spacing, and an oversampling multiple=a sampling frequency/the symbol rate=an upsampling multiple M/a downsampling multiple L.

Corresponding to the method provided in the foregoing method embodiments, an embodiment of this application further provides a corresponding communication apparatus. The communication apparatus includes a corresponding module configured to perform the foregoing embodiments. The module may be software, hardware, or a combination of software and hardware.

Figure 11:
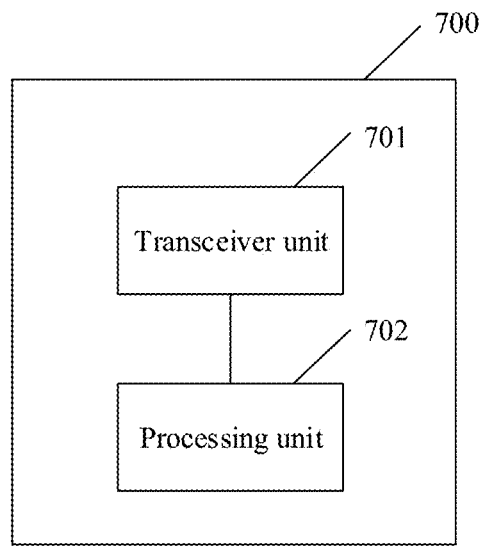
FIG. 11 is a schematic diagram of a structure of a communication apparatus according to an embodiment of this application.

FIG. 11 is a schematic diagram of a structure of a communication apparatus according to an embodiment of this application. The communication apparatus 700 shown in FIG. 11 may include a transceiver unit 701 and a processing unit 702. The transceiver unit 701 may include a sending unit and a receiving unit. The sending unit is configured to implement a sending function, the receiving unit is configured to implement a receiving function, and the transceiver unit 701 may implement a sending function and/or a receiving function. The transceiver unit may alternatively be described as a communication unit.

The communication apparatus 700 may be a terminal device, an apparatus in a terminal device, or an apparatus that can be used together with a terminal device.

In an embodiment, the transceiver unit 701 is configured to receive first indication information from a network device; and the processing unit 702 is configured to: determine transmission parameters corresponding to the first indication information, and transmit a signal based on the transmission parameters corresponding to the first indication information.

The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

In an embodiment, the transceiver unit 701 is further configured to: receive second indication information from the network device, where the second indication information is used to indicate a terminal device to transmit the signal based on transmission configuration information, and the transmission configuration information includes a plurality of configuration indexes and transmission parameters corresponding to the configuration indexes.

In an embodiment, the transceiver unit 701 is further configured to: send capability information, where the capability information is used to indicate the terminal device to support transmission configuration information-based transmission, or the capability information is used to request for transmission configuration information-based transmission, and the transmission configuration information includes the plurality of configuration indexes and the transmission parameters corresponding to the configuration indexes.

In an embodiment, the first indication information is used to indicate one of the plurality of configuration indexes; the transmission configuration information includes an association relationship between the transmission bandwidth and the extended bandwidth; and the processing unit 702 is configured to determine, based on the association relationship between the transmission bandwidth and the extended bandwidth, the transmission bandwidth and the extended bandwidth that correspond to the configuration index.

In an embodiment, the association relationship between the transmission bandwidth and the extended bandwidth is an association relationship between a quantity of subcarriers corresponding to the transmission bandwidth and a quantity of subcarriers corresponding to the extended bandwidth. For the association relationship between the quantity of subcarriers corresponding to the transmission bandwidth and the quantity of subcarriers corresponding to the extended bandwidth, refer to descriptions in the summary.

In an embodiment, the association relationship between the transmission bandwidth and the extended bandwidth is that a sum of the quantity of subcarriers corresponding to the transmission bandwidth and the quantity of subcarriers corresponding to the extended bandwidth is an integer multiple of 12, and the quantity of subcarriers corresponding to the transmission bandwidth is $a*2^n$, where a is a positive integer, and n is a positive integer.

In an embodiment, the transmission configuration information further includes an association relationship between the transmission bandwidth and a symbol rate, and the association relationship between the transmission bandwidth and the symbol rate is that the symbol rate=the quantity of subcarriers corresponding to the transmission bandwidth*a subcarrier spacing.

In an embodiment, the transmission configuration information further includes an oversampling multiple, where the oversampling multiple=a sampling rate/a symbol rate=an upsampling multiple/a downsampling multiple, the upsampling multiple and the downsampling multiple are integers, the downsampling multiple is greater than or equal to 1, and the upsampling multiple is greater than the downsampling multiple.

In an embodiment, the transmission configuration information further includes an association relationship between the transmission bandwidth or the extended bandwidth and the total bandwidth, and the association relationship between the transmission bandwidth or the extended bandwidth and the total bandwidth is that the total bandwidth=the transmission bandwidth+the extended bandwidth.

The capability information is carried in one or more of the following information: RRC information or RACH sequence information.

The first indication information is carried in one or more of the following information: DCI, RRC information, or MAC CE information.

The communication apparatus 700 may be a network device, an apparatus in a network device, or an apparatus that can be used together with a network device.

In an embodiment, the transceiver unit 701 is configured to: send second indication information to a terminal device, where the second indication information is used to indicate the terminal device to transmit a signal based on transmission configuration information; and send first indication information to the terminal device, where the first indication information is used to indicate the terminal device to determine transmission parameters corresponding to the first indication information.

In an embodiment, the transceiver unit 701 is further configured to receive capability information from the terminal device, where the capability information is used to indicate the terminal device to support transmission configuration information-based transmission, or is used to request for transmission configuration information-based transmission.

The transmission parameters include at least two of a transmission bandwidth, an extended bandwidth, or a total bandwidth, the transmission bandwidth is a bandwidth used to transmit the signal, and the extended bandwidth is a bandwidth used for spectrum shaping.

The transmission configuration information may include a plurality of configuration indexes and transmission parameters corresponding to the configuration indexes, and the first indication information is used to indicate one or more of the plurality of configuration indexes.

Figure 12:
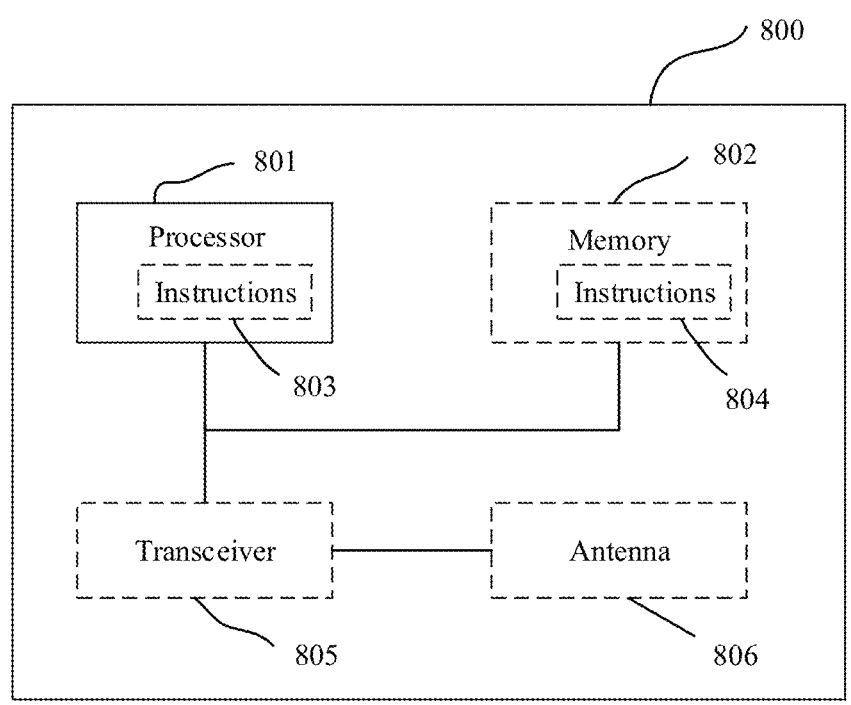
FIG. 12 is a schematic diagram of a structure of another communication apparatus according to an embodiment of this application.

FIG. 12 is a schematic diagram of a structure of a communication apparatus 800. The communication apparatus 800 may be a network device, may be a terminal device, may be a chip, a chip system, a processor, or the like that supports a network device in implementing the foregoing method, or may be a chip, a chip system, a processor, or the like that supports a terminal device in implementing the foregoing method. The apparatus may be configured to implement the methods described in the foregoing method embodiments. For details, refer to the descriptions in the foregoing method embodiments.

The communication apparatus 800 may include one or more processors 801. The processor 801 may be a general-purpose processor, a dedicated processor, or the like. For example, the processor 801 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

In an embodiment, the communication apparatus 800 may include one or more memories 802. The memory 802 may store instructions 804, and the instructions may be executed on the processor 801, so that the communication apparatus 800 performs the method described in the foregoing method embodiments. In an embodiment, the memory 802 may further store data. The processor 801 and the memory 802 may be disposed separately, or may be integrated together.

In an embodiment, the communication apparatus 800 may further include a transceiver 805 and an antenna 806. The transceiver 805 may be referred to as a transceiver unit, a transceiver machine, a transceiver circuit, or the like, and is configured to implement a transceiver function. The transceiver 805 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

When the communication apparatus 800 is a terminal device, the processor 801 is configured to: perform operation 503 and operation 504 in FIG. 5, and perform operation 603 and operation 604 in FIG. 6; and the transceiver 805 is configured to: perform operation 501, operation 502, and operation 505 in FIG. 5, and perform operation 601, operation 602, and operation 605 in FIG. 6.

When the communication apparatus 800 is a network device, the processor 801 is configured to: perform operation 506 in FIG. 5, and perform operation 606 in FIG. 6; and the transceiver 805 is configured to: perform operation 501, operation 502, and operation 505 in FIG. 5, and perform operation 601, operation 602, and operation 605 in FIG. 6.

Figure 13:
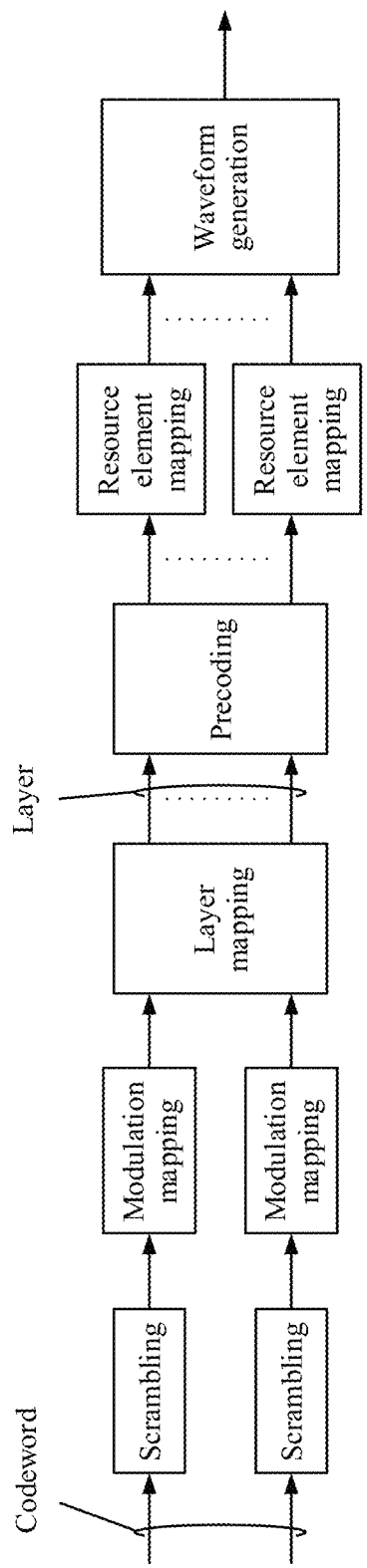
FIG. 13 is a schematic diagram of a processing procedure of a modulation and demodulation module.

When applied to an embodiment of the application, the processor 801 may include a modem module. For a processing procedure of the modem module, refer to FIG. 13. In FIG. 13, scrambling, modulation mapping, layer mapping, precoding, resource element mapping, and waveform generation processing is sequentially performed on a codeword. Finally, a signal obtained through processing is sent by using the transceiver 805.

When the communication apparatus 800 is a terminal device, a waveform generation module in FIG. 13 is configured to: perform operation 504 in FIG. 5, and perform operation 604 in FIG. 6.

It may be understood that the processing procedure shown in FIG. 7 or FIG. 9 may be executed by the waveform generation module in FIG. 13.

In an embodiment, the processor 801 may include a transceiver configured to implement receiving and sending functions. For example, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In an embodiment, for example, the processor 801 may store instructions 803, and when the instructions 803 are executed on the processor 801, the apparatus 800 is enabled to perform the method described in the foregoing method embodiments. The instructions 803 may be fixed in the processor 801. In this case, the processor 801 may be implemented by hardware.

In an embodiment, the communication apparatus 800 may include a circuit, and the circuit may implement the sending function, the receiving function, or the communication function in the foregoing method embodiments. The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The communication apparatus in the foregoing embodiment may be a network device or a terminal device. However, a scope of the communication apparatus described in this application is not limited thereto, and a structure of the communication apparatus may not be limited by FIG. 12. The communication apparatus may be an independent device or may be a part of a relatively large device. For example, the communication apparatus may be:

(1) an independent integrated circuit IC, a chip, or a chip system or subsystem;
(2) a set including one or more ICs, where in an embodiment, the IC set may further include a storage component configured to store data and instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others, or the like.

Figure 14:
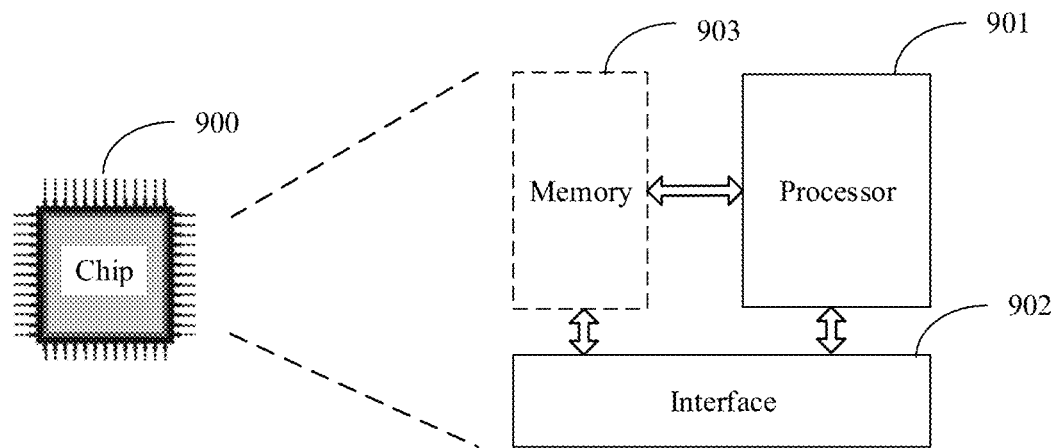
FIG. 14 is a schematic diagram of a structure of a chip according to an embodiment of this application.

For a case in which the communication apparatus may be a chip or a chip system, refer to a schematic diagram of a structure of a chip 900 shown in FIG. 14. The chip 900 shown in FIG. 14 includes a processor 901, and an interface 902. There may be one or more processors 901 and a plurality of interfaces 902.

When the chip is configured to implement a function of the terminal device in an embodiment of the application, the interface 902 is configured to receive downlink information, a downlink signal, or the like, for example, receive first indication information, second indication information, or a downlink signal. The processor 901 is configured to process information, data, or a signal. The interface 902 is further configured to output uplink information, an uplink signal, or the like.

For uplink transmission, the processor 901 processes an uplink symbol based on transmission parameters corresponding to the first indication information to obtain an uplink signal, where the uplink signal is a baseband signal, and outputs the baseband signal to a radio frequency circuit. The radio frequency circuit processes the baseband signal to obtain a radio frequency signal, and sends the radio frequency signal to the network device in a form of an electromagnetic wave by using an antenna.

For downlink transmission, the radio frequency circuit converts the radio frequency signal (carrying the downlink signal) received by using the antenna into the baseband signal (carrying the downlink signal), and inputs the baseband signal to the interface 902, and the processor 901 processes the downlink signal based on the transmission parameters corresponding to the first indication information to obtain a downlink symbol.

In an embodiment, the chip further includes a memory 903. The memory 903 is configured to store program instructions and data that are necessary for the terminal device.

Figure 15:
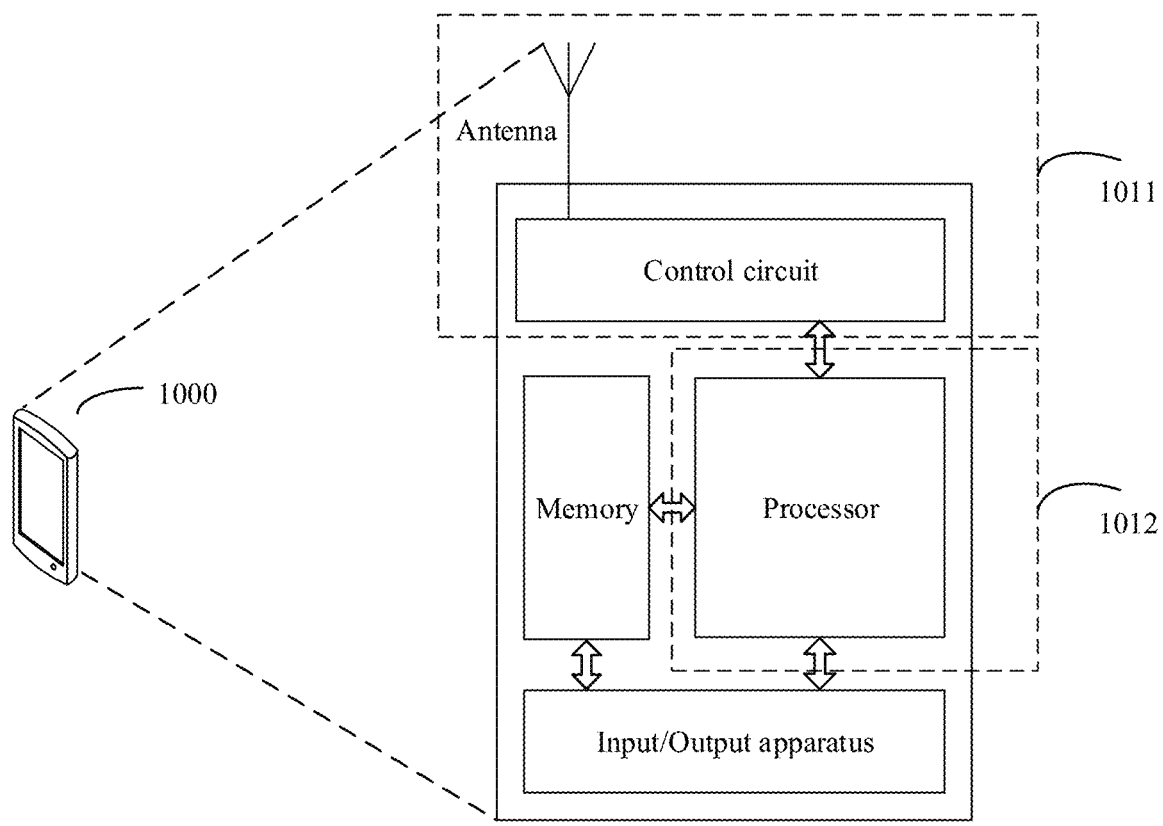
FIG. 15 is a schematic diagram of a structure of a terminal device according to an embodiment of this application.

FIG. 15 provides a schematic diagram of a structure of a terminal device 1000. For ease of description, FIG. 15 shows only main components of the terminal device. As shown in FIG. 15, the terminal device 1000 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The control circuit may include a radio frequency circuit, and the radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus, such as a touchscreen, a display, or a keyboard, is mainly configured to: receive data entered by a user and output data to the user.

After the terminal device is powered on, the processor may read the software program in a storage unit, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives the radio frequency signal by using the antenna, further converts the radio frequency signal into a baseband signal, and outputs the baseband signal to the processor. The processor converts the baseband signal into data, and processes the data.

For ease of description, FIG. 15 shows only one memory and one processor. In an actual terminal device, there may be a plurality of processors and a plurality of memories. The memory may also be referred to as a storage medium, a storage device, or the like. This is not limited in the embodiments of this application.

In an embodiment, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 15. One of ordinary skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be described as a baseband processing circuit or a baseband processing chip. The central processing unit may also be described as a central processing circuit or a central processing chip. A function of processing the communication protocol and the communication data may be built in the processor, or may be stored in the storage unit in a form of software program. The processor executes the software program to implement a baseband processing function.

One of ordinary skilled in the art may further understand that various illustrative logical blocks and operations that are listed in the embodiments of this application may be implemented by using electronic hardware, computer software, or a combination thereof. Whether the functions are implemented by using hardware or software depends on particular applications and a design requirement of the entire system. One of ordinary skilled in the art may use various methods to implement the described functions for each particular application, but it should not be considered that the implementation goes beyond the scope of the embodiments of this application.

This application further provides a machine (e.g., computer)-readable storage medium. The computer-readable storage medium stores a computer program, and when the computer-readable storage medium is executed by a machine (e.g., computer), a function of any one of the foregoing method embodiments is implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid state drive (SSD)), or the like.

One of ordinary skilled in the art may understand that various reference numerals such as "first" and "second" in this application are merely used for differentiation for ease of description, and are not used to limit a scope of the embodiments of this application, or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

One of ordinary skilled in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. One of ordinary skilled in the art may use different methods to implement the described functions for each particular application, but it should not be considered that the implementation goes beyond the scope of this application.

It may be clearly understood by one of ordinary skilled in the art that, for the purpose of convenient and brief description, for a detailed working process of the foregoing systems, apparatuses, and units, refer to a corresponding process in the foregoing method embodiments. Details are not described herein again.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A signal transmission method, comprising:
receiving second indication information from a network device, wherein the second indication information is used to indicate to a terminal device to transmit a signal based on transmission configuration information including an oversampling multiple equal to a sampling rate divided by a symbol rate equal to an upsampling multiple divided by a downsampling multiple; and wherein the upsampling multiple and the downsampling multiple are integers, the downsampling multiple is greater than or equal to 1, and the upsampling multiple is greater than the downsampling multiple, wherein the transmission configuration information comprises a plurality of configuration indexes and transmission parameters corresponding to the configuration indexes;
receiving first indication information from the network device, wherein the first indication information is used to indicate one of the plurality of configuration indexes, and the transmission configuration information comprises an association relationship between a transmission bandwidth and an extended bandwidth;

determining transmission parameters corresponding to the first indication information, further comprising:

determining, based on the association relationship between the transmission bandwidth and the extended bandwidth, the transmission bandwidth and the extended bandwidth that correspond to the configuration index; and transmitting the signal based on the determined transmission parameters in a scenario in which a single-carrier waveform and a multi-carrier waveform coexist, the determined transmission parameters including at least the extended bandwidth and one of the transmission bandwidth and a total bandwidth, wherein the total bandwidth is equal to the transmission bandwidth plus the extended bandwidth, wherein the transmission bandwidth is used to transmit the signal, and wherein the extended bandwidth is used for spectrum shaping.

2. The method according to claim 1, further comprising: sending capability information used to indicate that the terminal device supports transmission configuration information-based transmission, or the capability information is used to request for transmission configuration information-based transmission.

3. The method according to claim 1, wherein the association relationship between the transmission bandwidth and the extended bandwidth is an association relationship between a quantity of subcarriers corresponding to the transmission bandwidth and a quantity of subcarriers corresponding to the extended bandwidth, and wherein the association relationship between the quantity of subcarriers corresponding to the transmission bandwidth and the quantity of subcarriers corresponding to the extended bandwidth comprises one or more of the following:

the quantity of subcarriers corresponding to the transmission bandwidth is 6144, and the quantity of subcarriers corresponding to the extended bandwidth is 1536;

the quantity of subcarriers corresponding to the transmission bandwidth is 6144, and the quantity of subcarriers corresponding to the extended bandwidth is 684;

the quantity of subcarriers corresponding to the transmission bandwidth is 6144, and the quantity of subcarriers corresponding to the extended bandwidth is 672;

the quantity of subcarriers corresponding to the transmission bandwidth is 5120, and the quantity of subcarriers corresponding to the extended bandwidth is 1288;

the quantity of subcarriers corresponding to the transmission bandwidth is 5120, and the quantity of subcarriers corresponding to the extended bandwidth is 1276;

the quantity of subcarriers corresponding to the transmission bandwidth is 5120, and the quantity of subcarriers corresponding to the extended bandwidth is 580;

the quantity of subcarriers corresponding to the transmission bandwidth is 5120, and the quantity of subcarriers corresponding to the extended bandwidth is 568;

the quantity of subcarriers corresponding to the transmission bandwidth is 4096, and the quantity of subcarriers corresponding to the extended bandwidth is 1028;

the quantity of subcarriers corresponding to the transmission bandwidth is 4096, and the quantity of subcarriers corresponding to the extended bandwidth is 1016;

the quantity of subcarriers corresponding to the transmission bandwidth is 4096, and the quantity of subcarriers corresponding to the extended bandwidth is 464;

the quantity of subcarriers corresponding to the transmission bandwidth is 4096, and the quantity of subcarriers corresponding to the extended bandwidth is 452;

the quantity of subcarriers corresponding to the transmission bandwidth is 3072, and the quantity of subcarriers corresponding to the extended bandwidth is 768;

the quantity of subcarriers corresponding to the transmission bandwidth is 3072, and the quantity of subcarriers corresponding to the extended bandwidth is 348;

the quantity of subcarriers corresponding to the transmission bandwidth is 3072, and the quantity of subcarriers corresponding to the extended bandwidth is 336;

the quantity of subcarriers corresponding to the transmission bandwidth is 2560, and the quantity of subcarriers corresponding to the extended bandwidth is 644;

the quantity of subcarriers corresponding to the transmission bandwidth is 2560, and the quantity of subcarriers corresponding to the extended bandwidth is 632;

the quantity of subcarriers corresponding to the transmission bandwidth is 2560, and the quantity of subcarriers corresponding to the extended bandwidth is 296;

the quantity of subcarriers corresponding to the transmission bandwidth is 2560, and the quantity of subcarriers corresponding to the extended bandwidth is 284;

the quantity of subcarriers corresponding to the transmission bandwidth is 2048, and the quantity of subcarriers corresponding to the extended bandwidth is 520;

the quantity of subcarriers corresponding to the transmission bandwidth is 2048, and the quantity of subcarriers corresponding to the extended bandwidth is 508;

the quantity of subcarriers corresponding to the transmission bandwidth is 2048, and the quantity of subcarriers corresponding to the extended bandwidth is 232;

the quantity of subcarriers corresponding to the transmission bandwidth is 2048, and the quantity of subcarriers corresponding to the extended bandwidth is 220;

the quantity of subcarriers corresponding to the transmission bandwidth is 1536, and the quantity of subcarriers corresponding to the extended bandwidth is 384;

the quantity of subcarriers corresponding to the transmission bandwidth is 1536, and the quantity of subcarriers corresponding to the extended bandwidth is 180;

the quantity of subcarriers corresponding to the transmission bandwidth is 1536, and the quantity of subcarriers corresponding to the extended bandwidth is 168;

the quantity of subcarriers corresponding to the transmission bandwidth is 1280, and the quantity of subcarriers corresponding to the extended bandwidth is 328;

the quantity of subcarriers corresponding to the transmission bandwidth is 1280, and the quantity of subcarriers corresponding to the extended bandwidth is 316;

the quantity of subcarriers corresponding to the transmission bandwidth is 1280, and the quantity of subcarriers corresponding to the extended bandwidth is 148;

the quantity of subcarriers corresponding to the transmission bandwidth is 1280, and the quantity of subcarriers corresponding to the extended bandwidth is 136;

the quantity of subcarriers corresponding to the transmission bandwidth is 1024, and the quantity of subcarriers corresponding to the extended bandwidth is 260;

the quantity of subcarriers corresponding to the transmission bandwidth is 1024, and the quantity of subcarriers corresponding to the extended bandwidth is 248;

the quantity of subcarriers corresponding to the transmission bandwidth is 1024, and the quantity of subcarriers corresponding to the extended bandwidth is 104;

the quantity of subcarriers corresponding to the transmission bandwidth is 1024, and the quantity of subcarriers corresponding to the extended bandwidth is 116;

the quantity of subcarriers corresponding to the transmission bandwidth is 960, and the quantity of subcarriers corresponding to the extended bandwidth is 240;
the quantity of subcarriers corresponding to the transmission bandwidth is 960, and the quantity of subcarriers corresponding to the extended bandwidth is 96;
the quantity of subcarriers corresponding to the transmission bandwidth is 960, and the quantity of subcarriers corresponding to the extended bandwidth is 108;
the quantity of subcarriers corresponding to the transmission bandwidth is 768, and the quantity of subcarriers corresponding to the extended bandwidth is 192;
the quantity of subcarriers corresponding to the transmission bandwidth is 768, and the quantity of subcarriers corresponding to the extended bandwidth is 84;
the quantity of subcarriers corresponding to the transmission bandwidth is 768, and the quantity of subcarriers corresponding to the extended bandwidth is 96;
the quantity of subcarriers corresponding to the transmission bandwidth is 512, and the quantity of subcarriers corresponding to the extended bandwidth is 136;
the quantity of subcarriers corresponding to the transmission bandwidth is 512, and the quantity of subcarriers corresponding to the extended bandwidth is 124;
the quantity of subcarriers corresponding to the transmission bandwidth is 512, and the quantity of subcarriers corresponding to the extended bandwidth is 52;
the quantity of subcarriers corresponding to the transmission bandwidth is 512, and the quantity of subcarriers corresponding to the extended bandwidth is 64;
the quantity of subcarriers corresponding to the transmission bandwidth is 384, and the quantity of subcarriers corresponding to the extended bandwidth is 96;
the quantity of subcarriers corresponding to the transmission bandwidth is 384, and the quantity of subcarriers corresponding to the extended bandwidth is 48;
the quantity of subcarriers corresponding to the transmission bandwidth is 384, and the quantity of subcarriers corresponding to the extended bandwidth is 36;
the quantity of subcarriers corresponding to the transmission bandwidth is 320, and the quantity of subcarriers corresponding to the extended bandwidth is 88;
the quantity of subcarriers corresponding to the transmission bandwidth is 320, and the quantity of subcarriers corresponding to the extended bandwidth is 76;
the quantity of subcarriers corresponding to the transmission bandwidth is 320, and the quantity of subcarriers corresponding to the extended bandwidth is 40;
the quantity of subcarriers corresponding to the transmission bandwidth is 320, and the quantity of subcarriers corresponding to the extended bandwidth is 28;
the quantity of subcarriers corresponding to the transmission bandwidth is 256, and the quantity of subcarriers corresponding to the extended bandwidth is 56;
the quantity of subcarriers corresponding to the transmission bandwidth is 256, and the quantity of subcarriers corresponding to the extended bandwidth is 68;
the quantity of subcarriers corresponding to the transmission bandwidth is 256, and the quantity of subcarriers corresponding to the extended bandwidth is 32;
the quantity of subcarriers corresponding to the transmission bandwidth is 256, and the quantity of subcarriers corresponding to the extended bandwidth is 20;
the quantity of subcarriers corresponding to the transmission bandwidth is 192, and the quantity of subcarriers corresponding to the extended bandwidth is 48;
the quantity of subcarriers corresponding to the transmission bandwidth is 192, and the quantity of subcarriers corresponding to the extended bandwidth is 24;
the quantity of subcarriers corresponding to the transmission bandwidth is 192, and the quantity of subcarriers corresponding to the extended bandwidth is 12;
the quantity of subcarriers corresponding to the transmission bandwidth is 160, and the quantity of subcarriers corresponding to the extended bandwidth is 32;
the quantity of subcarriers corresponding to the transmission bandwidth is 160, and the quantity of subcarriers corresponding to the extended bandwidth is 44;
the quantity of subcarriers corresponding to the transmission bandwidth is 160, and the quantity of subcarriers corresponding to the extended bandwidth is 8;
the quantity of subcarriers corresponding to the transmission bandwidth is 160, and the quantity of subcarriers corresponding to the extended bandwidth is 20;
the quantity of subcarriers corresponding to the transmission bandwidth is 128, and the quantity of subcarriers corresponding to the extended bandwidth is 28;
the quantity of subcarriers corresponding to the transmission bandwidth is 128, and the quantity of subcarriers corresponding to the extended bandwidth is 40;
the quantity of subcarriers corresponding to the transmission bandwidth is 128, and the quantity of subcarriers corresponding to the extended bandwidth is 4;
the quantity of subcarriers corresponding to the transmission bandwidth is 128, and the quantity of subcarriers corresponding to the extended bandwidth is 16;
the quantity of subcarriers corresponding to the transmission bandwidth is 96, and the quantity of subcarriers corresponding to the extended bandwidth is 24;
the quantity of subcarriers corresponding to the transmission bandwidth is 96, and the quantity of subcarriers corresponding to the extended bandwidth is 12;
the quantity of subcarriers corresponding to the transmission bandwidth is 80, and the quantity of subcarriers corresponding to the extended bandwidth is 16;
the quantity of subcarriers corresponding to the transmission bandwidth is 80, and the quantity of subcarriers corresponding to the extended bandwidth is 4;
the quantity of subcarriers corresponding to the transmission bandwidth is 64, and the quantity of subcarriers corresponding to the extended bandwidth is 20;
the quantity of subcarriers corresponding to the transmission bandwidth is 64, and the quantity of subcarriers corresponding to the extended bandwidth is 8;
the quantity of subcarriers corresponding to the transmission bandwidth is 48, and the quantity of subcarriers corresponding to the extended bandwidth is 12;
the quantity of subcarriers corresponding to the transmission bandwidth is 40, and the quantity of subcarriers corresponding to the extended bandwidth is 8;
the quantity of subcarriers corresponding to the transmission bandwidth is 32, and the quantity of subcarriers corresponding to the extended bandwidth is 16; or
the quantity of subcarriers corresponding to the transmission bandwidth is 32, and the quantity of subcarriers corresponding to the extended bandwidth is 4.

4. The method according to claim 1, wherein the association relationship between the transmission bandwidth and the extended bandwidth is that a sum of a quantity of subcarriers corresponding to the transmission bandwidth and a quantity of subcarriers corresponding to the extended bandwidth is an integer multiple of 12, wherein the quantity of subcarriers corresponding to the transmission bandwidth is a times $2^n$, wherein a is a positive integer, and wherein n is a positive integer.

5. The method according to claim 1, wherein the transmission configuration information further comprises an association relationship between the transmission bandwidth and a symbol rate, and wherein the association relationship between the transmission bandwidth and the symbol rate is that the symbol rate is equal to a quantity of subcarriers corresponding to the transmission bandwidth times a subcarrier spacing.

6. The method according to claim 1, wherein the transmission configuration information further comprises an association relationship between the transmission bandwidth or the extended bandwidth and the total bandwidth, and wherein the association relationship between the transmission bandwidth or the extended bandwidth and the total bandwidth is that the total bandwidth is equal to the transmission bandwidth plus the extended bandwidth.

7. A communication apparatus, comprising:
a transceiver configured to receive first indication information, wherein the transceiver is further configured to receive second indication information from a network device, wherein the second indication information is used to indicate to a terminal device to transmit a signal based on transmission configuration information including an oversampling multiple equal to a sampling rate divided by a symbol rate equal to an upsampling multiple divided by a downsampling multiple; and wherein the upsampling multiple and the downsampling multiple are integers, the downsampling multiple is greater than or equal to 1, and the upsampling multiple is greater than the downsampling multiple, wherein the transmission configuration information comprises a plurality of configuration indexes and transmission parameters corresponding to the configuration indexes; and
a processor configured to determine transmission parameters corresponding to the first indication information, wherein the first indication information is used to indicate one of the plurality of configuration indexes, and the transmission configuration information comprises an association relationship between a transmission bandwidth and an extended bandwidth, the processor further configured to determine, based on the association relationship between the transmission bandwidth and the extended bandwidth, the transmission bandwidth and the extended bandwidth that correspond to the configuration index, and to transmit the signal based on the determined transmission parameters in a scenario in which a single-carrier waveform and a multi-carrier waveform coexist, the determined transmission parameters including at least the extended bandwidth and one of the transmission bandwidth and a total bandwidth, wherein the total bandwidth is equal to the transmission bandwidth plus the extended bandwidth, wherein
the transmission bandwidth is used to transmit the signal, and wherein the extended bandwidth is used for spectrum shaping.

8. The communication apparatus according to claim 7, wherein the transceiver is further configured to send capability information, wherein the capability information is used to indicate that the terminal device supports transmission configuration information-based transmission, or the capability information is used to request for transmission configuration information-based transmission.

9. The communication apparatus according to claim 7, wherein the association relationship between the transmission bandwidth and the extended bandwidth is an association relationship between a quantity of subcarriers corresponding to the transmission bandwidth and a quantity of subcarriers corresponding to the extended bandwidth, and wherein the association relationship between the quantity of subcarriers corresponding to the transmission bandwidth and the quantity of subcarriers corresponding to the extended bandwidth comprises one or more of the following:
the quantity of subcarriers corresponding to the transmission bandwidth is 6144, and the quantity of subcarriers corresponding to the extended bandwidth is 1536;
the quantity of subcarriers corresponding to the transmission bandwidth is 6144, and the quantity of subcarriers corresponding to the extended bandwidth is 684;
the quantity of subcarriers corresponding to the transmission bandwidth is 6144, and the quantity of subcarriers corresponding to the extended bandwidth is 672;
the quantity of subcarriers corresponding to the transmission bandwidth is 5120, and the quantity of subcarriers corresponding to the extended bandwidth is 1288;
the quantity of subcarriers corresponding to the transmission bandwidth is 5120, and the quantity of subcarriers corresponding to the extended bandwidth is 1276;
the quantity of subcarriers corresponding to the transmission bandwidth is 5120, and the quantity of subcarriers corresponding to the extended bandwidth is 580;
the quantity of subcarriers corresponding to the transmission bandwidth is 5120, and the quantity of subcarriers corresponding to the extended bandwidth is 568;
the quantity of subcarriers corresponding to the transmission bandwidth is 4096, and the quantity of subcarriers corresponding to the extended bandwidth is 1028;
the quantity of subcarriers corresponding to the transmission bandwidth is 4096, and the quantity of subcarriers corresponding to the extended bandwidth is 1016;
the quantity of subcarriers corresponding to the transmission bandwidth is 4096, and the quantity of subcarriers corresponding to the extended bandwidth is 464;
the quantity of subcarriers corresponding to the transmission bandwidth is 4096, and the quantity of subcarriers corresponding to the extended bandwidth is 452;
the quantity of subcarriers corresponding to the transmission bandwidth is 3072, and the quantity of subcarriers corresponding to the extended bandwidth is 768;
the quantity of subcarriers corresponding to the transmission bandwidth is 3072, and the quantity of subcarriers corresponding to the extended bandwidth is 348;
the quantity of subcarriers corresponding to the transmission bandwidth is 3072, and the quantity of subcarriers corresponding to the extended bandwidth is 336;
the quantity of subcarriers corresponding to the transmission bandwidth is 2560, and the quantity of subcarriers corresponding to the extended bandwidth is 644;
the quantity of subcarriers corresponding to the transmission bandwidth is 2560, and the quantity of subcarriers corresponding to the extended bandwidth is 632;
the quantity of subcarriers corresponding to the transmission bandwidth is 2560, and the quantity of subcarriers corresponding to the extended bandwidth is 296;
the quantity of subcarriers corresponding to the transmission bandwidth is 2560, and the quantity of subcarriers corresponding to the extended bandwidth is 284;

the quantity of subcarriers corresponding to the transmission bandwidth is 2048, and the quantity of subcarriers corresponding to the extended bandwidth is 520;
the quantity of subcarriers corresponding to the transmission bandwidth is 2048, and the quantity of subcarriers corresponding to the extended bandwidth is 508;
the quantity of subcarriers corresponding to the transmission bandwidth is 2048, and the quantity of subcarriers corresponding to the extended bandwidth is 232;
the quantity of subcarriers corresponding to the transmission bandwidth is 2048, and the quantity of subcarriers corresponding to the extended bandwidth is 220;
the quantity of subcarriers corresponding to the transmission bandwidth is 1536, and the quantity of subcarriers corresponding to the extended bandwidth is 384;
the quantity of subcarriers corresponding to the transmission bandwidth is 1536, and the quantity of subcarriers corresponding to the extended bandwidth is 180;
the quantity of subcarriers corresponding to the transmission bandwidth is 1536, and the quantity of subcarriers corresponding to the extended bandwidth is 168;
the quantity of subcarriers corresponding to the transmission bandwidth is 1280, and the quantity of subcarriers corresponding to the extended bandwidth is 328;
the quantity of subcarriers corresponding to the transmission bandwidth is 1280, and the quantity of subcarriers corresponding to the extended bandwidth is 316;
the quantity of subcarriers corresponding to the transmission bandwidth is 1280, and the quantity of subcarriers corresponding to the extended bandwidth is 148;
the quantity of subcarriers corresponding to the transmission bandwidth is 1280, and the quantity of subcarriers corresponding to the extended bandwidth is 136;
the quantity of subcarriers corresponding to the transmission bandwidth is 1024, and the quantity of subcarriers corresponding to the extended bandwidth is 260;
the quantity of subcarriers corresponding to the transmission bandwidth is 1024, and the quantity of subcarriers corresponding to the extended bandwidth is 248;
the quantity of subcarriers corresponding to the transmission bandwidth is 1024, and the quantity of subcarriers corresponding to the extended bandwidth is 104;
the quantity of subcarriers corresponding to the transmission bandwidth is 1024, and the quantity of subcarriers corresponding to the extended bandwidth is 116;
the quantity of subcarriers corresponding to the transmission bandwidth is 960, and the quantity of subcarriers corresponding to the extended bandwidth is 240;
the quantity of subcarriers corresponding to the transmission bandwidth is 960, and the quantity of subcarriers corresponding to the extended bandwidth is 96;
the quantity of subcarriers corresponding to the transmission bandwidth is 960, and the quantity of subcarriers corresponding to the extended bandwidth is 108;
the quantity of subcarriers corresponding to the transmission bandwidth is 768, and the quantity of subcarriers corresponding to the extended bandwidth is 192;
the quantity of subcarriers corresponding to the transmission bandwidth is 768, and the quantity of subcarriers corresponding to the extended bandwidth is 84;
the quantity of subcarriers corresponding to the transmission bandwidth is 768, and the quantity of subcarriers corresponding to the extended bandwidth is 96;
the quantity of subcarriers corresponding to the transmission bandwidth is 512, and the quantity of subcarriers corresponding to the extended bandwidth is 136;
the quantity of subcarriers corresponding to the transmission bandwidth is 512, and the quantity of subcarriers corresponding to the extended bandwidth is 124;
the quantity of subcarriers corresponding to the transmission bandwidth is 512, and the quantity of subcarriers corresponding to the extended bandwidth is 52;
the quantity of subcarriers corresponding to the transmission bandwidth is 512, and the quantity of subcarriers corresponding to the extended bandwidth is 64;
the quantity of subcarriers corresponding to the transmission bandwidth is 384, and the quantity of subcarriers corresponding to the extended bandwidth is 96;
the quantity of subcarriers corresponding to the transmission bandwidth is 384, and the quantity of subcarriers corresponding to the extended bandwidth is 48;
the quantity of subcarriers corresponding to the transmission bandwidth is 384, and the quantity of subcarriers corresponding to the extended bandwidth is 36;
the quantity of subcarriers corresponding to the transmission bandwidth is 320, and the quantity of subcarriers corresponding to the extended bandwidth is 88;
the quantity of subcarriers corresponding to the transmission bandwidth is 320, and the quantity of subcarriers corresponding to the extended bandwidth is 76;
the quantity of subcarriers corresponding to the transmission bandwidth is 320, and the quantity of subcarriers corresponding to the extended bandwidth is 40;
the quantity of subcarriers corresponding to the transmission bandwidth is 320, and the quantity of subcarriers corresponding to the extended bandwidth is 28;
the quantity of subcarriers corresponding to the transmission bandwidth is 256, and the quantity of subcarriers corresponding to the extended bandwidth is 56;
the quantity of subcarriers corresponding to the transmission bandwidth is 256, and the quantity of subcarriers corresponding to the extended bandwidth is 68;
the quantity of subcarriers corresponding to the transmission bandwidth is 256, and the quantity of subcarriers corresponding to the extended bandwidth is 32;
the quantity of subcarriers corresponding to the transmission bandwidth is 256, and the quantity of subcarriers corresponding to the extended bandwidth is 20;
the quantity of subcarriers corresponding to the transmission bandwidth is 192, and the quantity of subcarriers corresponding to the extended bandwidth is 48;
the quantity of subcarriers corresponding to the transmission bandwidth is 192, and the quantity of subcarriers corresponding to the extended bandwidth is 24;
the quantity of subcarriers corresponding to the transmission bandwidth is 192, and the quantity of subcarriers corresponding to the extended bandwidth is 12;
the quantity of subcarriers corresponding to the transmission bandwidth is 160, and the quantity of subcarriers corresponding to the extended bandwidth is 32;
the quantity of subcarriers corresponding to the transmission bandwidth is 160, and the quantity of subcarriers corresponding to the extended bandwidth is 44;
the quantity of subcarriers corresponding to the transmission bandwidth is 160, and the quantity of subcarriers corresponding to the extended bandwidth is 8;
the quantity of subcarriers corresponding to the transmission bandwidth is 160, and the quantity of subcarriers corresponding to the extended bandwidth is 20;
the quantity of subcarriers corresponding to the transmission bandwidth is 128, and the quantity of subcarriers corresponding to the extended bandwidth is 28;

the quantity of subcarriers corresponding to the transmission bandwidth is 128, and the quantity of subcarriers corresponding to the extended bandwidth is 40;

the quantity of subcarriers corresponding to the transmission bandwidth is 128, and the quantity of subcarriers corresponding to the extended bandwidth is 4;

the quantity of subcarriers corresponding to the transmission bandwidth is 128, and the quantity of subcarriers corresponding to the extended bandwidth is 16;

the quantity of subcarriers corresponding to the transmission bandwidth is 96, and the quantity of subcarriers corresponding to the extended bandwidth is 24;

the quantity of subcarriers corresponding to the transmission bandwidth is 96, and the quantity of subcarriers corresponding to the extended bandwidth is 12;

the quantity of subcarriers corresponding to the transmission bandwidth is 80, and the quantity of subcarriers corresponding to the extended bandwidth is 16;

the quantity of subcarriers corresponding to the transmission bandwidth is 80, and the quantity of subcarriers corresponding to the extended bandwidth is 4;

the quantity of subcarriers corresponding to the transmission bandwidth is 64, and the quantity of subcarriers corresponding to the extended bandwidth is 20;

the quantity of subcarriers corresponding to the transmission bandwidth is 64, and the quantity of subcarriers corresponding to the extended bandwidth is 8;

the quantity of subcarriers corresponding to the transmission bandwidth is 48, and the quantity of subcarriers corresponding to the extended bandwidth is 12;

the quantity of subcarriers corresponding to the transmission bandwidth is 40, and the quantity of subcarriers corresponding to the extended bandwidth is 8;

the quantity of subcarriers corresponding to the transmission bandwidth is 32, and the quantity of subcarriers corresponding to the extended bandwidth is 16; or the quantity of subcarriers corresponding to the transmission bandwidth is 32, and the quantity of subcarriers corresponding to the extended bandwidth is 4.

10. The communication apparatus according to claim 7, wherein the association relationship between the transmission bandwidth and the extended bandwidth is that a sum of a quantity of subcarriers corresponding to the transmission bandwidth and a quantity of subcarriers corresponding to the extended bandwidth is an integer multiple of 12, wherein the quantity of subcarriers corresponding to the transmission bandwidth is a times $2^n$, wherein a is a positive integer, and wherein n is a positive integer.

11. The communication apparatus according to claim 7, wherein the transmission configuration information further comprises an association relationship between the transmission bandwidth and a symbol rate, and wherein the association relationship between the transmission bandwidth and the symbol rate is that the symbol rate is equal to a quantity of subcarriers corresponding to the transmission bandwidth times a subcarrier spacing.

12. The communication apparatus according to claim 7, wherein the transmission configuration information further comprises an association relationship between the transmission bandwidth or the extended bandwidth and the total bandwidth, and wherein the association relationship between the transmission bandwidth or the extended bandwidth and the total bandwidth is that the total bandwidth is equal to the transmission bandwidth plus the extended bandwidth.

13. A non-transitory machine-readable storage medium having instructions stored therein, which when executed by a processor, cause the processor to perform operations, the operations comprising:

receiving second indication information from a network device, wherein the second indication information is used to indicate to a terminal device to transmit a signal based on transmission configuration information including an oversampling multiple equal to a sampling rate divided by a symbol rate equal to an upsampling multiple divided by a downsampling multiple; and wherein the upsampling multiple and the downsampling multiple are integers, the downsampling multiple is greater than or equal to 1, and the upsampling multiple is greater than the downsampling multiple, wherein the transmission configuration information comprises a plurality of configuration indexes and transmission parameters corresponding to the configuration indexes;

receiving first indication information from the network device, wherein the first indication information is used to indicate one of the plurality of configuration indexes, and the transmission configuration information comprises an association relationship between a transmission bandwidth and an extended bandwidth;

determining transmission parameters corresponding to the first indication information, further comprising:

determining, based on the association relationship between the transmission bandwidth and the extended bandwidth, the transmission bandwidth and the extended bandwidth that correspond to the configuration index; and transmitting the signal based on the determined transmission parameters in a scenario in which a single-carrier waveform and a multi-carrier waveform coexist, the determined transmission parameters including at least the extended bandwidth and one of the transmission bandwidth and a total bandwidth, wherein the total bandwidth is equal to the transmission bandwidth plus the extended bandwidth, wherein the transmission bandwidth is used to transmit the signal, and wherein the extended bandwidth is used for spectrum shaping.

* * * * *